US009607321B2

(12) United States Patent
Brown et al.

(10) Patent No.: US 9,607,321 B2
(45) Date of Patent: *Mar. 28, 2017

(54) FIXED POSITION INTERACTIVE ADVERTISING

(71) Applicant: Microsoft Corporation, Redmond, WA (US)

(72) Inventors: Darrick Paul Brown, Redwood City, CA (US); David Ross Lerman, New York, CA (US); Troy William Young, Mill Valley, CA (US); Matthew Allen Sanchez, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,896

(22) Filed: Dec. 21, 2012

(65) Prior Publication Data

US 2013/0117129 A1    May 9, 2013

Related U.S. Application Data

(63) Continuation of application No. 12/756,934, filed on Apr. 8, 2010, now abandoned, which is a
(Continued)

(51) Int. Cl.
*G06Q 30/00* (2012.01)
*G06Q 30/02* (2012.01)
*G05B 19/418* (2006.01)

(52) U.S. Cl.
CPC ......... *G06Q 30/0269* (2013.01); *G06Q 30/02* (2013.01); *G06Q 30/0277* (2013.01)

(58) Field of Classification Search
None
See application file for complete search history.

(56) References Cited

U.S. PATENT DOCUMENTS 5,848,396 A    12/1998  Gerace
5,935,004 A     8/1999  Tarr et al.
(Continued)

FOREIGN PATENT DOCUMENTS

WO    9741673       11/1997
WO    9741673 A2    11/1997
(Continued)

OTHER PUBLICATIONS

-"In your face", Kessler, Andrew J. Forbes. vol. 152. Issue 7. pp. 140. Publication year 1993. Publication date Sep 27, 1993. NY. This article discusses how much will pay the advertisers for keeping the user engaged with interactive advertisement.*
(Continued)

*Primary Examiner* — Victoria Vanderhorst
(74) *Attorney, Agent, or Firm* — Michael Kondoudis; The Law Office of Michael E. Kondoudis

(57) ABSTRACT

Computer-based systems and methods for an advertisement displayed on a fixed position on a web browser window displaying a visible portion of a web page. The fixed position advertisement remains in its fixed position in view of the user as the user scrolls the web page in various directions. The advertisement may be sized, shaped, or formatted based on the available space on the web page and on the content of the advertisement. The advertisement may include a variety of static and dynamic content, including interaction prompts and other elements, which may enable an engagement-based revenue generation model.

24 Claims, 16 Drawing Sheets

Related U.S. Application Data continuation-in-part of application No. 11/781,830, filed on Jul. 23, 2007, now Pat. No. 8,494,907.

(60) Provisional application No. 60/820,077, filed on Jul. 21, 2006.

(56) References Cited

U.S. PATENT DOCUMENTS

| | | | |
|---|---|---|---|
| 5,995,943 A | 11/1999 | Bull et al. | |
| 6,202,058 B1 | 3/2001 | Rose et al. | |
| 6,202,062 B1 | 3/2001 | Cameron et al. | |
| 6,230,204 B1* | 5/2001 | Fleming, III | 709/229 |
| 6,385,591 B1 | 5/2002 | Mankoff | |
| 6,452,609 B1 | 9/2002 | Katinsky et al. | |
| 6,553,178 B2 | 4/2003 | Abecassis | |
| 6,690,481 B1 | 2/2004 | Yeung et al. | |
| 6,731,312 B2 | 5/2004 | Robbin | |
| 6,732,090 B2 | 5/2004 | Shanahan et al. | |
| 6,834,372 B1 | 12/2004 | Becker et al. | |
| 7,010,710 B2 | 3/2006 | Piazza | |
| 7,028,001 B1 | 4/2006 | Muthuswamy et al. | |
| 7,133,837 B1 | 11/2006 | Barnes, Jr. | |
| 7,188,085 B2 | 3/2007 | Pelletier | |
| 7,213,005 B2 | 5/2007 | Mourad et al. | |
| 7,617,272 B2 | 11/2009 | Bulson et al. | |
| 7,734,503 B2 | 6/2010 | Agarwal et al. | |
| 7,840,911 B2 | 11/2010 | Milener et al. | |
| 7,930,206 B2 | 4/2011 | Koningstein | |
| 8,234,275 B2 | 7/2012 | Grant et al. | |
| 8,306,859 B2 | 11/2012 | Lerman et al. | |
| 8,554,630 B2 | 10/2013 | Grant et al. | |
| 2001/0041053 A1 | 11/2001 | Abecassis | |
| 2001/0052000 A1 | 12/2001 | Giacalone, Jr. | |
| 2002/0016736 A1 | 2/2002 | Cannon et al. | |
| 2002/0023230 A1 | 2/2002 | Bolnick et al. | |
| 2002/0052925 A1 | 5/2002 | Kim et al. | |
| 2002/0054087 A1 | 5/2002 | Noll et al. | |
| 2002/0059590 A1 | 5/2002 | Kitsukawa et al. | |
| 2002/0067730 A1 | 6/2002 | Hinderks et al. | |
| 2002/0077900 A1 | 6/2002 | Thompson et al. | |
| 2002/0078456 A1 | 6/2002 | Hudson et al. | |
| 2002/0104090 A1 | 8/2002 | Stettner | |
| 2002/0147634 A1 | 10/2002 | Jacoby et al. | |
| 2003/0101230 A1 | 5/2003 | Benschoter et al. | |
| 2003/0110130 A1 | 6/2003 | Pelletier | |
| 2003/0117433 A1 | 6/2003 | Milton et al. | |
| 2003/0120541 A1 | 6/2003 | Siann et al. | |
| 2003/0135464 A1 | 7/2003 | Mourad et al. | |
| 2003/0229900 A1 | 12/2003 | Reisman | |
| 2004/0010806 A1* | 1/2004 | Yuen et al. | 725/136 |
| 2004/0015398 A1 | 1/2004 | Hayward | |
| 2004/0085364 A1 | 5/2004 | Keely et al. | |
| 2005/0080878 A1 | 4/2005 | Cunningham et al. | |
| 2005/0091111 A1 | 4/2005 | Green et al. | |
| 2005/0096980 A1* | 5/2005 | Koningstein | 705/14 |
| 2005/0125838 A1 | 6/2005 | Wang et al. | |
| 2005/0137958 A1 | 6/2005 | Huber et al. | |
| 2005/0216936 A1* | 9/2005 | Knudson et al. | 725/42 |
| 2005/0267813 A1 | 12/2005 | Monday | |
| 2006/0075348 A1 | 4/2006 | Xu et al. | |
| 2006/0107198 A1 | 5/2006 | Solomon et al. | |
| 2006/0173985 A1 | 8/2006 | Moore | |
| 2006/0253584 A1 | 11/2006 | Dixon et al. | |
| 2006/0259923 A1 | 11/2006 | Chiu | |
| 2006/0277481 A1 | 12/2006 | Forstall et al. | |
| 2007/0150338 A1 | 6/2007 | Malik | |
| 2007/0233556 A1 | 10/2007 | Koningstein | |
| 2007/0276729 A1 | 11/2007 | Freer | |
| 2007/0300152 A1 | 12/2007 | Baugher | |
| 2008/0183568 A1 | 7/2008 | Ida et al. | |
| 2008/0244038 A1 | 10/2008 | Martinez | |
| 2009/0024463 A1 | 1/2009 | Szeto | |
| 2009/0044145 A1 | 2/2009 | Seo | |
| 2009/0271611 A1 | 10/2009 | Roll | |
| 2010/0004977 A1 | 1/2010 | Marci et al. | |
| 2010/0198697 A1 | 8/2010 | Brown et al. | |
| 2011/0125594 A1 | 5/2011 | Brown | |
| 2012/0226659 A1 | 9/2012 | Ball et al. | |
| 2012/0239469 A1 | 9/2012 | Steinberg et al. | |
| 2013/0054559 A1 | 2/2013 | Pettit | |
| 2013/0073402 A1 | 3/2013 | Lerman et al. | |
| 2013/0291012 A1 | 10/2013 | Lerman et al. | |
| 2014/0136347 A1 | 5/2014 | Lerman et al. | |
| 2014/0244407 A1 | 8/2014 | Brown et al. | |
| 2016/0078499 A1 | 3/2016 | Brown et al. | |

FOREIGN PATENT DOCUMENTS

| | | |
|---|---|---|
| WO | 0038428 | 6/2000 |
| WO | 0038428 A1 | 6/2000 |
| WO | 0203706 A1 | 1/2002 |
| WO | 2012140464 A1 | 10/2012 |

OTHER PUBLICATIONS

Juno Gets Two More Patents Covering Offline Email, CBR Staff Writer, Dec. 14, 1998.

"Advertisers Must Use Interactive Tools With Care", Business Wire, Ovum Report Warns: Mobile Internet Not Just Another Channel for High-Volume Push., Jun. 5, 2000.

"Think About That for a Minute", Anonymous, Cablefax. v12n51, Mar 15, 2001, 1 pg.

Shaw, "The interactive living revolution (Interactive Living) (interactive television still shows potential)", Russell Broadcasting & Cable, Mar. 31, 2003, vol. 133, No. 13, p. 3A(8).

"Lenel Systems International, Inc. Press Release", Newswire, Mar. 12, 1996, 4 pgs.

Forbes, "The digital press", Mammoth Micro Productions, Churbuck, v152 , n7, Sept 27, 1993., p. 136(2).

Office Action dated May 20, 2014 issued in related European Patent Application No. 7 813 238.8.

"America Online as RealNetworks Expand Relationship to Enable Streamed Interactive Marketing Services Using Helix Universal Servers", Sep. 19, 2002, PR Newswire.

United States Patent and Trademark Office, "Non-Final Office Action Issued in U.S. Appl. No. 13/923,595", Aug. 1, 2014, 20 pages, United States.

Canadian Intellectual Property Office, "Office Action Issued in Canadian Patent Application No. 2659042", Apr. 25, 2014, 4 pages, Canada.

"Office Action Issued in U.S. Appl. No. 13/013,565", Mailed Date: Dec. 19, 2014, 10 pages.

Canadian Intellectual Property Office, "Office Action Issued in Canadian Patent Application No. 2659042", Apr. 8, 2015, 7 pages.

United States Patent and Trademark Office, "Final Office Action Issued in U.S. Appl. No. 13/923,595", Apr. 27, 2015, 24 pages.

Reid et al., "The Readership of Liquor Ads Employing Appeals to Affiliation, Achievement, and Product-Attributes", Annual Meeting of the Association for Education in Journalism, Jul. 1982, pp. 1-13, Athens, Ohio, USA.

Shaw, "The interactive living revolution. (Interactive Living).(Industry Overview)", Publication—Multichannel news Publisher—Highbeam Research Date—Mar. 31, 2003.

United States Patent and Trademark Office, "Office Action Issued in U.S. Appl. No. 13/013,565", Dec. 19, 2014, 10 pages, USA.

United States Patent and Trademark Office, "Non-Final Office Action Issued on Nov. 10, 2015 in U.S. Appl. No. 13/923,595", Mailed Date: Nov. 10, 2015, United States.

"Final Office Action Issued in U.S. Appl. No. 11/781,830", Mailed Date: Dec. 1, 2011, 21 Pages.

"Non-Final Office Action Issued in U.S. Appl. No. 11/781,830", Mailed Date: May 12, 2011, 19 Pages.

"Non-Final Office Action Issued in U.S. Appl. No. 13/923,595", Mailed Date: Jan. 22, 2014, 17 Pages.

"Non-Final Office Action Issued in U.S. Appl. No. 12/209,062", Mailed Date: Aug. 11, 2011, 18 Pages.

"Final Office Action Issued in U.S. Appl. No. 13/923,595", Mailed Date: May 12, 2016, 30 pages.

(56) References Cited

OTHER PUBLICATIONS

"Non-Final Office Action Issued in U.S. Appl. No. 12/209,107", Mailed Date: Jul. 7, 2011, 29 pages.
"Non-Final Office Action Issued in U.S. Appl. No. 12/209,107", Mailed Date: Dec. 29, 2011, 24 pages.
"Non-Final Office Action Issued in U.S. Appl. No. 13/678,156", Mailed Date: Mar. 15, 2013, 14 pages.
"Final Office Action Issued in U.S. Appl. No. 12/209,126", Mailed Date: Feb. 28, 2012, 33 pages.
"Non-Final Office Action Issued in U.S. Appl. No. 12/209,126", Mailed Date: Aug. 18, 2011, 23 pages.
"Non-Final Office Action Issued in U.S. Appl. No. 13/117,994", Mailed Date: Sep. 27, 2013, 17 pages.
"Final Office Action Issued in U.S. Appl. No. 12/209,138", Mailed Date: May 15, 2012, 24 pages.
"Non-Final Office Action Issued in U.S. Appl. No. 12/209,138", Mailed Date: Sep. 16, 2011, 25 pages.
"Final Office Action Issued in U.S. Appl. No. 12/572,109", Mailed Date: Apr. 30, 2012, 22 pages.
"Non-Final Office Action Issued in U.S. Appl. No. 12/572,109", Mailed Date: Oct. 27, 2011, 18 pages.
"Non-Final Office Action Issued in U.S. Appl. No. 13/013,565", Mailed Date: Sep. 11, 2013, 16 pages.
"Non-Final Office Action Issued in U.S. Appl. No. 12/756,934", Mailed Date: Jun. 21, 2012, 15 pages.
"Final Office Action Issued in U.S. Appl. No. 13/013,565", Mailed Date: Feb. 5, 2014, 15 pages.
"Non-Final Office Action Issued in U.S. Appl. No. 14/156,932", Mailed Date: Jun. 22, 2016, 22 pages.
Clark, T. Michael, "Photoshop Page Curl Effect", Retrieved from <<http://web.archive.org/web/20000304004555/http://www.grafx-design.com/15photo.html>>, 1998, 7 Pages.
Canadian Intellectual Property Office, "Office Action Issued in related Canadian Patent Application No. 2659042", Oct. 28, 2016, 9 pages, Canada.
"Final Office Action Issued in U.S. Appl. No. 14/156,932", Mailed Date: Oct. 28, 2016, 28 pages.
United States Patent and Trademark Office, "Non-Final Office Action Issued in co-pending U.S. Appl. No. 14/947,057", Oct. 20, 2016, 15 Pages, USA.
United States Patent and Trademark Office, "Non-Final Office Action Issued in U.S. Appl. No. 14/255,199", Nov. 2, 2016, 28 pages.

\* cited by examiner

FIXED POSITION INTERACTIVE ADVERTISING

CROSS-REFERENCES TO RELATED APPLICATIONS

This application is a continuation-in-part of and claims priority to U.S. application Ser. No. 12/209,126 entitled "Interactive Advertising" filed Sep. 11, 2008; which is a continuation-in-part of and claims priority to U.S. application Ser. No. 11/781,830 entitled "Systems and Methods for Interaction Prompt Initiated Video Advertising," filed on Jul. 23, 2007; which takes priority from provisional patent application Ser. No. 60/820,077, filed Jul. 21, 2006, wherein the afore-referenced applications are hereby incorporated by reference.

BRIEF DESCRIPTION OF THE INVENTION

Computer-based systems and methods for an advertisement displayed on a fixed position on a web browser window displaying a visible portion of a web page. The fixed position advertisement remains in its fixed position in view of the user as the user scrolls the web page in various directions. The fixed position advertisement may be sized, shaped, or formatted based on the available space on the web page. The advertisement may include a variety of static and dynamic content, including interaction prompts and other elements, which may enable an engagement-based revenue generation model.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

Traditional Internet or World Wide Web marketing/advertising operates on a "pay per impression" (PPI) basis. PPI is mostly used in association with banner advertising, where an advertiser pays a small amount to a website, advertising network, or other advertising reseller or aggregator (each a "publisher") each time the advertiser's advertisement is loaded into a user's web browser and displayed to the user (the "impression") by the publisher.

In addition to being paid by impression, publishers can also be paid if a user clicks on the banner advertisement (a "click through" event or "pay-per-click") and the user is directed to a website associated with the advertisement. Upon direction to the website, the advertiser becomes obligated to pay the publisher of that banner advertisement some amount of money for the referral. Many websites are completely funded through the mass collection of small payments from many different advertisers for both PPI and click through events.

In the same manner that advertising has changed over time, so too has the nature of the advertisements themselves. Many traditional advertisements have been static in nature, comprised of a picture and some text related to the subject matter being advertised. More recent advertisements have included multimedia object technologies (such as JAVA, SHOCKWAVE, FLASH, etc.) that utilize sound, video and/or animated content to grab a user's attention. Video advertising (whether live motion or animated) has frequently been used in association with other video content, such as playing a video commercial in association with a video trailer for a movie. Sometimes the video advertisement is displayed before the video content ("pre roll"), in the middle of the video content or a series of videos ("mid roll"), or after the video content ("post roll").

Whether the advertisement content is static or dynamic, the size of the advertisement is often limited to a set of pre-defined sizes by the publisher. For example, the standard wide and short, "full" banner advertisement, as established by the Interactive Advertising Bureau ("IAB"), is 468×60 pixels in size. The IAB has also set guidelines for other advertisement units, such rectangular and pop-up advertisements (336×280, 300×250, 250×250, 240×400 and 180×150), banner and button advertisements (728×90, 468×60, 234×60, 120×90, 120×60, 88×31, 80×15, 120×240 and 125×125), and skyscraper advertisements (120×600, 160×600 and 300×600). Rather than attempt to make all advertisement content fit every single advertisement unit, an advertiser will frequently generate advertisement content for use in just a couple of advertisement units, based on the sizes available, and force the publishers to fit that content into the space they have available on their websites. Publishers need a way to effectively select and arrange the multimedia content within an advertisement (including new forms of content) to fit many different advertisement units, as well as non-standard advertisement units, while maintaining the quality of the advertisement for the advertisers.

A problem faced by advertisers is that once the advertisement unit is placed on a website, there is no guarantee that the users will pay attention to it or will interact with it. This is especially the case on websites that host blogs and sites where the posting of user content and comments make the websites long, requiring the user to scroll to view the entire contents of the website. Advertisements are typically placed near the top of pages, ensuring that the user sees the advertisement when the page is loaded. However, the proliferation and common use of advertisements in the majority of websites has reduced the effect of such exposure. When the user is viewing a long page, many times users scroll down the web page, ignoring the advertisement and making the advertisement useless since it is not viewed, and if it is viewed, it is only viewed for a short period of time.

Likewise, while PPI advertising can initially be lucrative for a publisher, PPI has proven to be less effective over time because many users become overwhelmed with banner advertisements and begin to ignore them. For advertisers, this means that while they continue to pay for impressions, the value of such impressions is diluted due to the jaded nature of the users. While pay-per-click advertising addresses this issue for some direct-response oriented advertisers, many advertisers are just trying to build brand awareness rather than get users to their sites, so they are not interested in paying on a pay-per-click basis. Advertisers therefore need another method of measuring the effectiveness of an advertisement. The challenge is to develop an advertising system that forces greater accountability on those publishing advertisements to users and allows advertisers to more objectively measure the effectiveness of their advertisements on their intended audience.

DETAILED DESCRIPTION OF THE INVENTION

Although embodiments of the invention may be described in terms of various methods, the embodiments also relate to apparatus for performing the operations herein. This apparatus may be specially constructed for the required purposes, or it may comprise a general-purpose computer selectively activated or reconfigured by a computer program stored in the computer. Such a computer program may be stored in any form of computer readable storage medium. Likewise, the methods described herein are not inherently related to any particular computer or other apparatus. Various general-purpose systems may be used with programs in accordance with the teachings herein, or specialized apparatus for performing the required method steps could be constructed.

Figure 1:
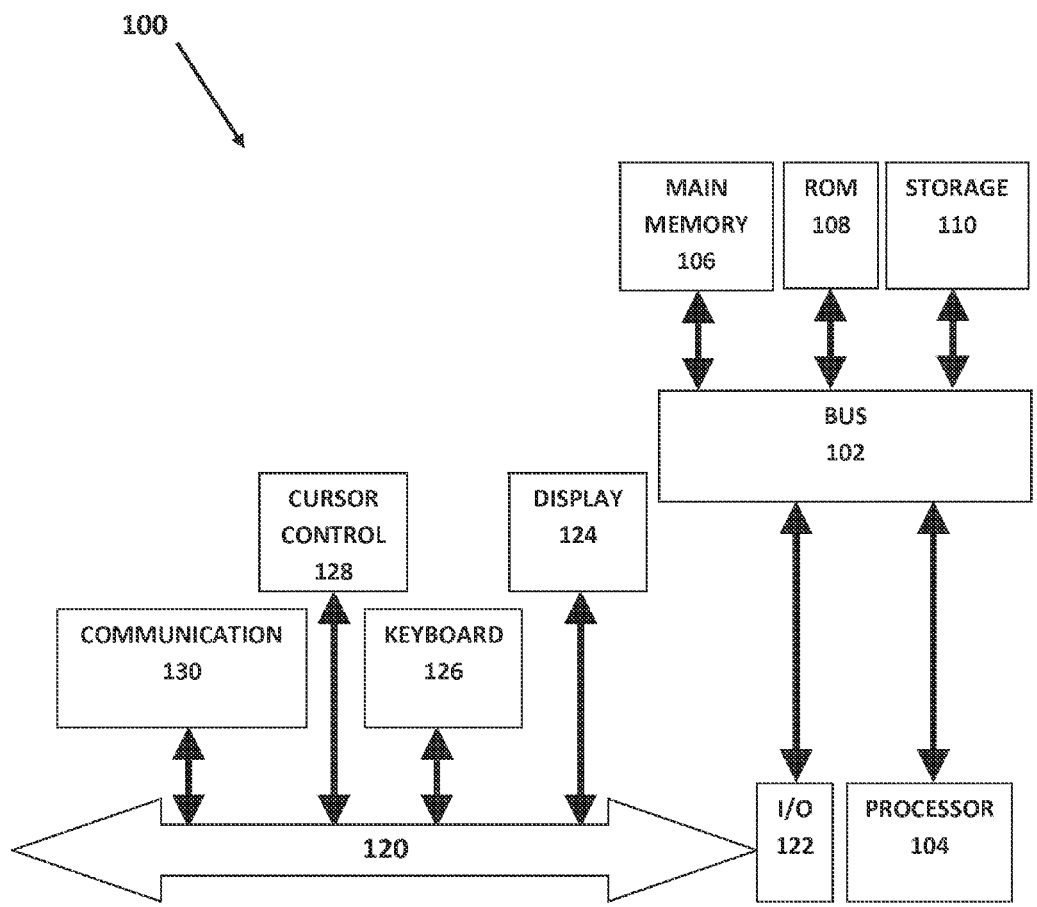
FIG. 1 illustrates an exemplary computer architecture for use with an embodiment.

FIG. 1 illustrates a general-purpose computer system that could be utilized to implement the systems and methods of an embodiment. The general computer architecture 100 depicted can be used to implement a user's computer, application servers, websites, advertisement managers, advertising servers, and other elements of an embodiment that are presented in further detail below. One embodiment of architecture 100 comprises a system bus 102 for communicating information, and a processor 104 coupled to the bus 102 for processing information. Architecture 100 further comprises a random access memory (RAM) or other dynamic storage device 106 (referred to herein as main memory), coupled to the bus 102 for storing information and instructions to be executed by processor 104. Main memory 106 also may be used for storing temporary variables or other intermediate information during execution of instructions by processor 104. Architecture 100 also may include a read only memory (ROM) and/or other static storage devices 108 coupled to bus 102 for storing static information and instructions used by processor 104.

A data storage device 110 such as a magnetic disk or optical disc and its corresponding drive may also be coupled to the bus 102 for storing information and instructions. Architecture 100 can also be coupled to a second I/O bus 120 via an I/O interface 122. A plurality of I/O devices may be coupled to I/O bus 120, including a display device 124, an input device (e.g., a keyboard 126) and/or a cursor control device 128. The communication device 130 allows for access to other computers (servers or clients) via a network. The communication device 130 may comprise a modem, a network interface card, a wireless network interface or other well-known interface device, such as those used for coupling to an Ethernet, token ring, or other type of network.

In general, an embodiment relates to when a user accesses a website or other on-line location for displaying certain content on the user's computer (whether that computer is in the form of a desktop, laptop or other type of computing device, such as a personal digital assistance (PDA), a cellular phone, a smart phone or some other type of device) and the user is presented with that content, as well as additional content, such as one or more advertisements, through some sort of display. In one embodiment, an interactive advertisement consists of an initial advertisement first presented to a user/viewer as an invitation or teaser that attracts the user to the initial advertisement and encourages the user's engagement. If the user engages in an appropriate way with the invitation, the initial advertisement might change in some fashion, such as enlarging or taking over the user's display, to become what is referred to herein as an expanded message. The invitation or invitation advertisement would typically include one or more engagement properties that encourage the user to initially engage or interact with the advertisement content and so as to trigger the expanded message. Once the user so engages, an obligation by the advertiser to pay the publisher may be triggered. Payment obligations can vary based on the nature and extent of user engagement, as further described below.

The engagement properties include the user's movement of a cursor over the advertisement content (a "mouse over"), the user's entry of one or more keystrokes from a keyboard, clicking on or otherwise selecting the advertisement content, allowing a countdown or timer to expire as a result of a sustained mouse over the advertisement content, or some other form of user interaction with the advertisement. For example, when using a PDA or phone with motion detection capabilities, it might be possible to engage an advertisement by moving the PDA or phone in a particular way. Similarly, a motion or gesture recognition device associated with the user's computer could be trained to recognize certain user gestures to indicate engagement, such as a head nod, eye blink, hand motion, etc. Of course, many more methods of engagement or interaction are possible, so embodiments are not limited to just the manners specified herein.

To present these advertisements and their various features to the user, a file (such as an extensible mark-up language (XML) document/file) is served to an advertisement manager in communication with the accessed website/location and some form of content player within the user's computer. The advertisement manager would then take over control of the user's advertisement experience through the utilization of information contained within the XML file. Advertisement servers and/or content delivery networks that store digital advertising content or media assets (including text, images, video, animations, hyperlinks, widgets, dynamic micro-sites, programs, sound, slideshows, etc.) would then serve the content necessary to create the advertisements and their various features, as further described below, in response to the advertisement manager and content player (or other application within the user's computer that is calling for the advertisement).

Figure 2:
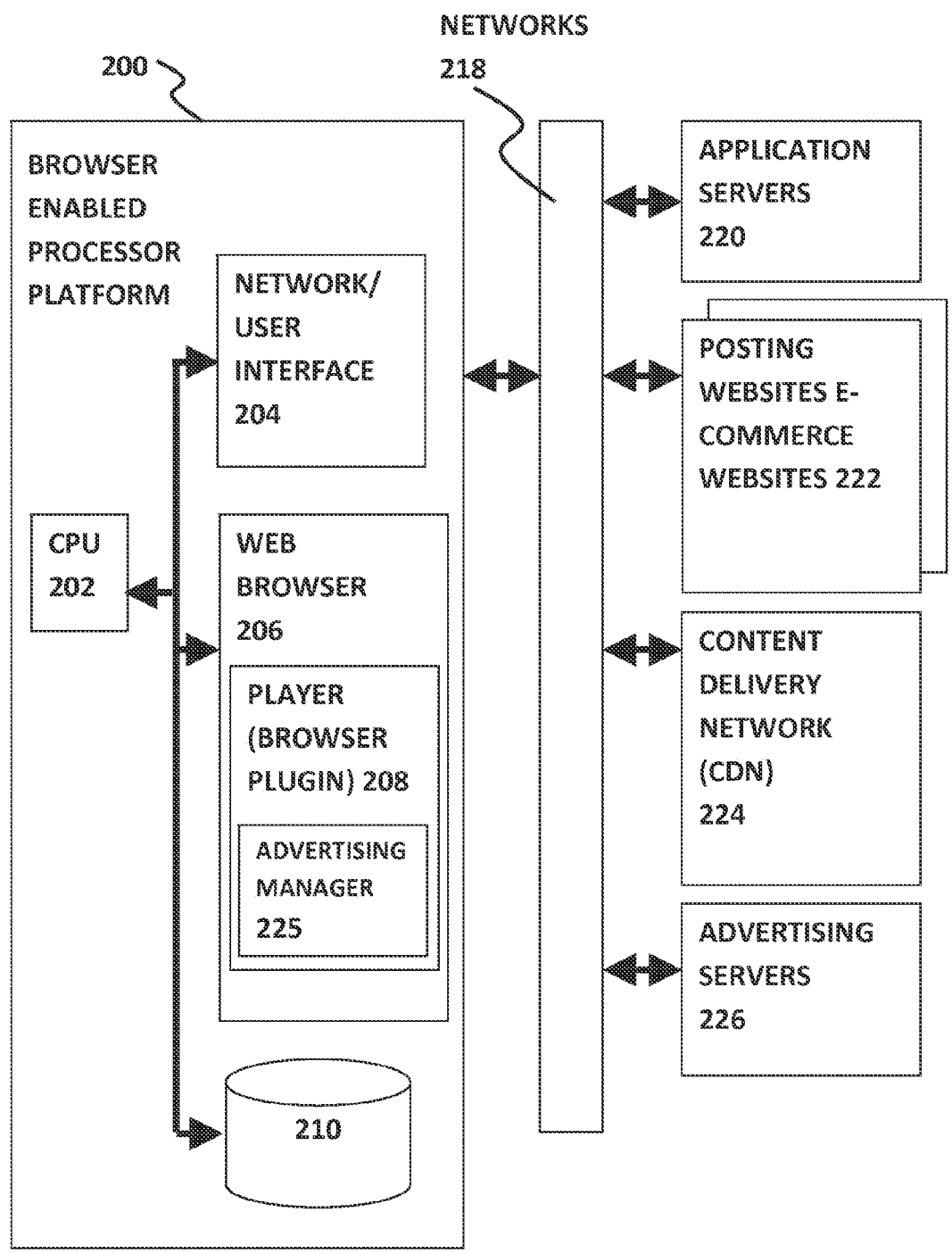
FIG. 2 illustrates a block diagram of a user computer, a network, websites, and other networked components that enable an embodiment.

FIG. 2 illustrates a block diagram of a typical user computer, a network, and other networked servers, websites and systems necessary to implement an embodiment. The browser enabled processor platform (i.e., the user's personal computer or laptop computer) 200 includes central processor unit (CPU) 202, a network/user interface 204, a web browser 206, which includes a player 208 (such as a browser plug-in), and a memory 210. The user of the processor platform 200 may interact with a variety of networks 218, application servers 220, websites 222, a content delivery network (CDN) 224 and advertisement servers 226.

The CPU 202 executes software code for the basic operation of the platform 200. The executable code may include an Operating System, programs, device drivers and other software components. Device drivers may include I/O device drivers and network interface drivers. A device driver may interface to a keypad or to a USB port. A network interface driver may execute protocols for the Internet, or an intranet, Wide Area Network (WAN), Local Area Network (LAN), Personal Area Network (PAN), extranet, or other network.

The memory 210 may contain transactional memory and/or long-term storage memory facilities. The memory 210 may function as file or document storage, program storage, or working memory. A working memory 210 may include, but is not limited to, static random access memory, dynamic random access memory, read-only memory, cache or flash memory. A working memory 210 may, for example, process temporally-based instructions, in part, by temporarily storing code relating to an action of a device and purging that code from the memory in close temporal proximity to the completion of the action. A long-term memory 210 may include, but is not limited to, a hard drive, portable drive, portable disk (e.g., a CD-ROM, DVD, etc.), tape facility, or other storage facility. A hardware memory facility may store a fixed information set (e.g., software code) including, but not limited to, a file, program, application, source code, object code, and the like.

The browser enabled processor platform 200 may also contain hardware for converting analog signals to digital data, or for converting digital signals into analog signals. For example, it may be necessary to convert an analog audio or video source into digital data for storage or playback. As another example, analog signals from a light sensor device could be converted into digital data for the storage of visual information for subsequent storage, playback, or transfer.

The browser enabled processor platform 200 may also include various I/O interfaces, such a hardware network interface, one or more displays, CD/DVDs, storage device, keypads/keyboards, printers, or other standard interfaces. An example of a hardware network interface may be a broadband connection, a dial-up connection, wireless, or other connection. An example of a display may be a monitor, plasma screen, or a liquid crystal display. An example of other standard interfaces may include, but is not limited to, a USB port, parallel port, serial port, microphone, or speaker.

Although the player 208 shown in FIG. 2 is configured as a browser plug-in, it could alternatively be any other form of software component that is adapted to be directly associated with a browser application 206. The player 208 may be a downloadable software component or delivered to the user of the browser enabled processor platform 200 in any number of other ways (e.g., delivered from a CD, DVD, memory stick, portable memory, FTP transfer, etc.). The networks 218 include the Internet and other possible networks, such as Wide Area Networks (WANs), Local Area Networks (LANs), or any other system for enabling two or more devices to exchange information. Further, the networks 218 may include wireless networks.

The player 208 may be a proprietary player or any other player because the advertising capabilities described herein are independent of the player. If the player 208 is a plug-in, it may be a FLASH plug-in player or some similar type of device. Other players are also envisioned and require other plug-in technology (e.g. WINDOWS MEDIA, REAL PLAYER or QUICKTIME players).

In an embodiment, the player 208 is adapted to become directly associated or integrated with the browser application 206. Before playing an advertisement, the user's browser enabled processor platform 200 may be checked to see if it already has the proper player 208 installed and if it does not, the user may be provided with an option to install one, or it may be installed automatically or in some other fashion. The player 208 will be installed in such a way that its functionalities (e.g., opening files from a variety of sources, playing video, music, etc.) are presented to a user through the network/user interface 210, which operates in conjunction with the web browser 206. The player 208 may not be visible to user. This configuration allows a user to interact with websites 222 through the web browser 206 and then interact with any of the player's 208 functionalities through the same user interface. The player 208 may also access the memory 210, such as a hard drive or other storage facility for the storage and retrieval of files.

A user interested in interacting with content presented to the user through a website 222, depending on the particular arrangement between the different systems on the networks, may interact with that content directly on the website 222, or through the content delivery network 224, or on the processor platform 200, if it has been downloaded to the processor platform 200. The content can also be presented to the user by streaming the content from the websites 222, content delivery network 224, or another processor platform (not shown) connected to the networks 218.

Advertising servers 226 are web or other Internet-based applications responsible for choosing an appropriate advertisement to be inserted into a given calling application (as further described below). The advertising servers perform a number of different functions. For example, according to one embodiment, advertising servers 226 provide advertising content to content delivery network 224, so that advertisements may be provided along with other content. Advertising servers 226 may be part of content delivery network 224, or independent servers. The advertising servers also provide XML files to the advertisement manager 225 within the player 208 that controls the display and interaction by the user with the advertising content. According to one embodiment, advertising servers 226 collect advertising content from various advertisers. Advertising servers 226 may also receive information from the content delivery network 224 pertaining to the users who view content through the content delivery network 224.

As noted above, the advertisement manager 225 controls the user's interaction with the advertising content played by the player 208. The advertisement manager 225 passes information about the user and the user's interaction to the content delivery network 224, which collects this information. The information includes the user's Internet Protocol (IP) address, geographic location, nature or theme of the website on which an advertisement is being displayed, the nature of the specific content viewed by the user, the user's web viewing history or patterns, as well as other psychographic data about the user (which may be received from a number of different sources). The content delivery network 224 may also collect information about the user's age, location, gender, income, education, ethnicity, product preferences and a variety of other demographic characteristics that are useful in matching an advertisement to a user. The content delivery network 224 may also collect information about the user's viewing experience such as the location of player 208, the genre of the content viewed, the type of content viewed (e.g., video, slideshow, widget), and the location of the player 208 within the browser.

This information can be aggregated with similar information about other users and transferred to various advertisers, who will pay for this information. According to one embodiment, the information is passed from the content delivery network 224 to the advertising server 226 once a user begins to watch content on a player. If a website has provided the player, it may also provide code that causes the user's information to be passed to the content delivery network 224 and advertising server 226.

A user choosing to interact with content on the content delivery network 224 may use his/her own browser enabled processor platform 200 equipped with a network browsing facility, such as the network interface 204 and player 208 to connect to a content file by interacting with a link or other such connection facility associated with a website 222 (or page thereof) as is described in much further detail below.

Figure 3:
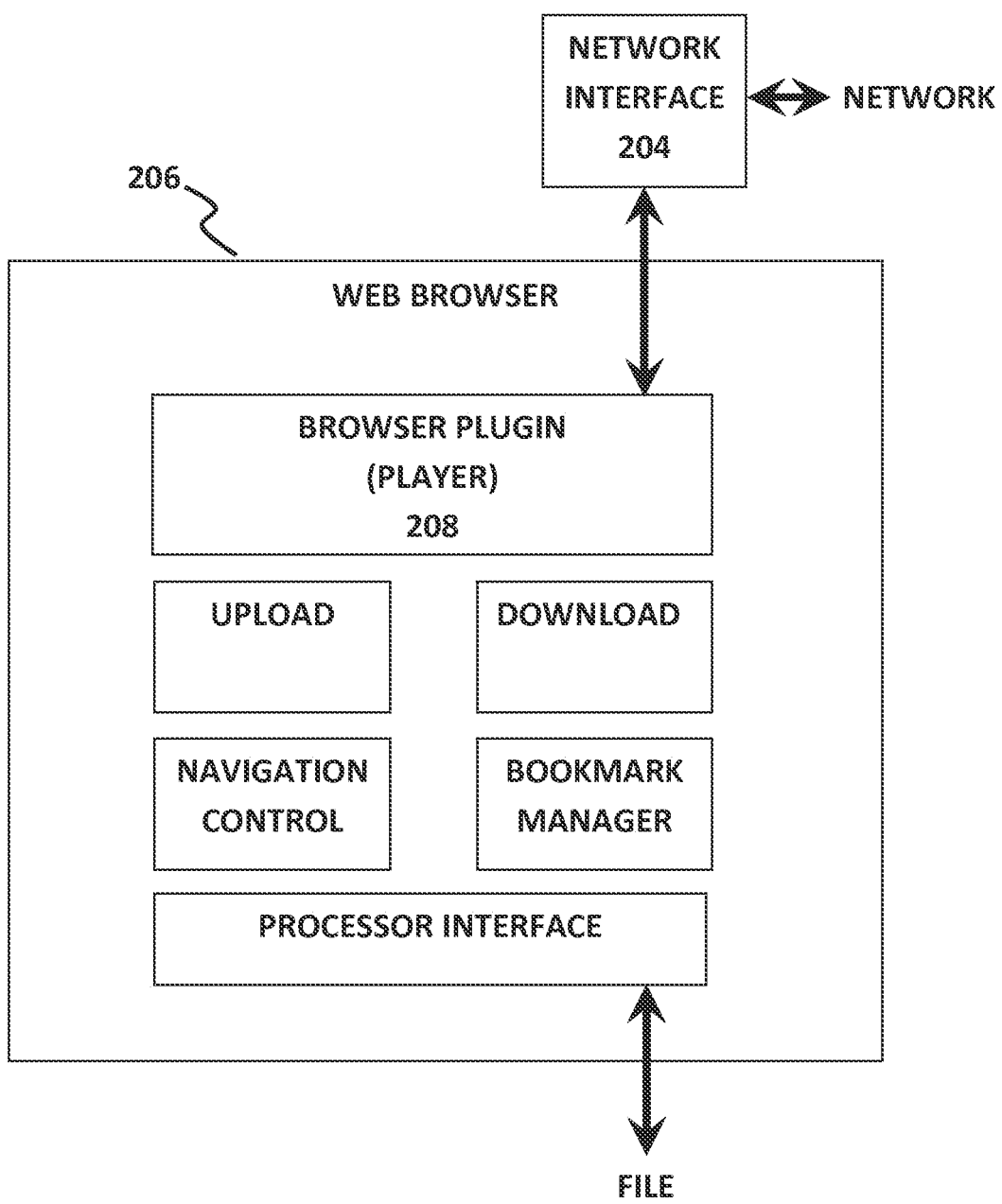
FIG. 3 illustrates a block diagram of an exemplary web browser of an embodiment.

FIG. 3 illustrates a block diagram of some of the functional aspects of an exemplary web browser 206, according to one embodiment. The web browser 206 may host the player 208 (e.g., as an integrated browser plug-in) and may provide for the interconnection of the player 208 with external components such as network 218 and file storage within networked storage, such as on the content delivery network 224. The browser 206 may provide upload and download functions through its own processor interface, or through the network interface 204, so as to transfer files to and from other processor platforms, provide user interface network navigation tools, and provide other network user interface tools. The web browser 206 may also provide for a web interface to the user with functions that include navigation control within web pages, bookmark management, favorite page storage and the like.

Figure 4:
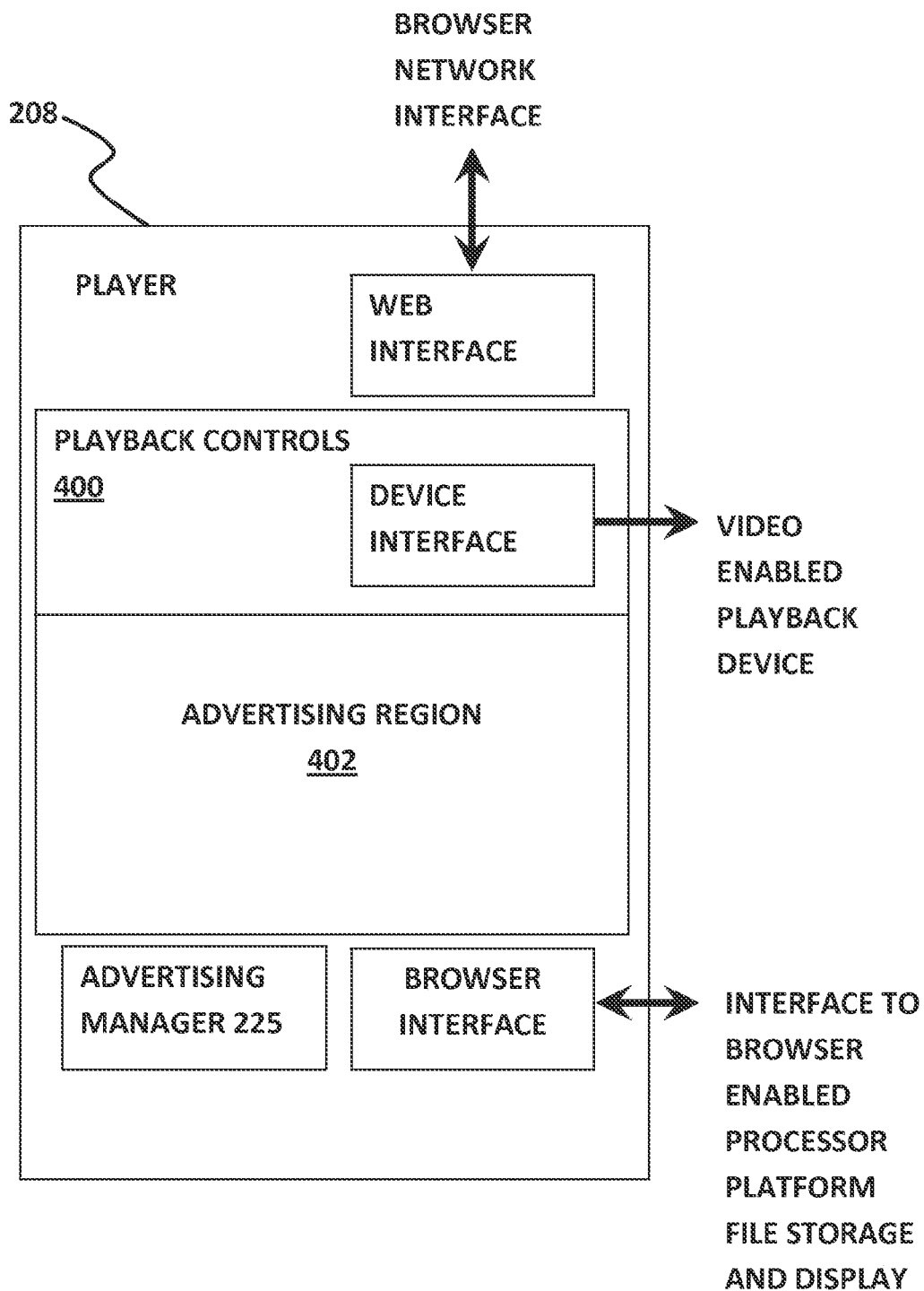
FIG. 4 depicts a block diagram of an exemplary player of an embodiment.

FIG. 4 depicts a block diagram of an exemplary player, such as player 208, according to one embodiment. The player 208 displays content selected by the viewer or made available to the user through a website. The player 208 also provides a user interface that allows the downloading, copying, viewing and interaction of content files previously stored on the content delivery network 224 or elsewhere, such as the advertising servers 226. The downloading of or other interaction with content files, as described herein, is enabled through the player's web interface to the browser network interface. The video viewing or navigation interface of the player 208 may be a FLASH-based, or other some other type of browser-based, player adapted to deliver content as a part of a website. The player 208 may also be a FLASH-based navigation interface which allows users to select content to view. Content files may also be stored in the browser enabled processor platform 200 through the player's browser interface. To the degree that video content is involved, playback controls 400 can provide typical VCR/DVR-type controls, such as play, stop, pause, rewind, fast forward, copy, paste, cut, save, and other such control features.

A client may embed the player 208 directly into any type of interactive electronic document using Hyper-Text Markup Language (HTML). When the player 208 requests content from the content delivery network 224, or the advertising servers 226, that content is then be made available to the player 208 for display and interaction. The application servers 220 monitor traffic to and from the content delivery network 224, take action when necessary, such as to delete content, and generate reporting data for advertisers.

The browser 206 may be a software application for navigating one or more networks 218, such as the Internet, intranet, extranet, a private network, and or content in file systems. The browser 206 also enables a user to display and interact with text, images, videos, audio and other content accessible through the networks 218. Such content may contain hyperlinks to navigate to other web pages at the same or different websites 222. Web browser 206 may allow a user to navigate and access information provided on many web pages at many websites 222 by traversing these links. Web browser 206 may also provide other features such as storing the address for a favorite website utilizing the browser's Bookmark Manager. Examples of bookmarked websites 222 may be hyperlinks to other personal sites, e-commerce sites, government sites, or educational sites. Another feature of web browser 206 may be caching, where recently visited websites 222 are transferred through the processor interface and stored in processor memory to decrease retrieval time for subsequent calls for the website 222. Examples of web browser 206 include the MICROSOFT INTERNET EXPLORER, MOZILLA FIREFOX, OPERA and APPLE SAFARI browsers. Although browser 206 may typically be used to access the World Wide Web, it may also be used to access information provided by web servers in private networks or content in file systems.

Web browser 206 may communicate with web servers through the network interface primarily using Hyper-Text Transfer Protocol (HTTP) to fetch web pages. HTTP may allow a web browser 206 to upload information across the network interface to web servers as well as download web pages from them. Web pages are located by means of a Uniform Resource Locator (URL), which may be treated as an address, beginning with http: for HTTP access. Many browsers 206 may support a variety of other URL types and their corresponding protocols. Examples of other URL types may be ftp: for File Transfer Protocol (FTP), rtsp: for Real-Time Streaming Protocol (RTSP), and https: for HTTPS (an SSL encrypted version of HTTP). The file format for a web page may be HTML. Browser 206 may also support formats in addition to HTML. Examples of other support formats may be JPEG, PNG and GIF image formats, and can be extended to support more through the use of browser plug-ins. An example of a browser plug-in may be MACROMEDIA's Flash or APPLE'S QUICKTIME applications. The combination of HTTP and URL protocol specification may allow web pages to have embedded images, animations, video, sound, and streaming media into the webpage, or make them accessible through the web page.

The player 208 also includes an advertising region 402 that may or may not contain an advertisement. For example, the advertisement manager 225 may cause an image of a cola bottle to be displayed within a display window corresponding to a website 222. The cola bottle could be limited to being displayed within the advertising region 402, but need not be so constrained. The cola bottle could come out of the advertising message, such as an invitation or teaser advertisement, and move around the screen in some fashion, or when the website was first displayed, the cola bottle could be made to travel around different parts of the window or the display area of the user's computer, with the intent of capturing the user's attention and drawing them to interact with advertising messages within the advertising region 402 or elsewhere. These advertising messages may be self-activating or trigged by a user's interaction with some form of an interaction prompt within a window or the advertising region 402.

According to one embodiment, the invitation or teaser advertisement could be associated with a single advertiser or multiple advertisers. For example, the invitation could represent an advertisement for a single good or service from a single advertiser, or multiple goods or services from that advertiser. Likewise, multiple different advertisers could be represented by a single invitation space. Each good or service could be presented in a different way. For example, a rectangular-shaped invitation space could be broken up into four quadrants, with a different good or service presented in each quadrant of the space. Alternatively, the different advertisements could operate like a slide show, with one advertisement being shown in the invitation space for a number of seconds before being replaced by another advertisement.

This might make it possible for a publisher to fully exploit an advertising opportunity in a new way. For example, if a user within a particular demographic, such as 18-34 year old males, was not interested in the one good or service presented in an invitation with a single advertisement, the opportunity to engage that user could be lost. However, if the same user were presented with a number of different advertisements at the same time or in sequence, the user might be interested in one of the advertised goods/services and choose to engage with that advertisement. Once the user has engaged with that advertisement, if the user has a good experience, the user might be inclined to engage with some of the other advertisements provided in the same invitation.

Figure 5:
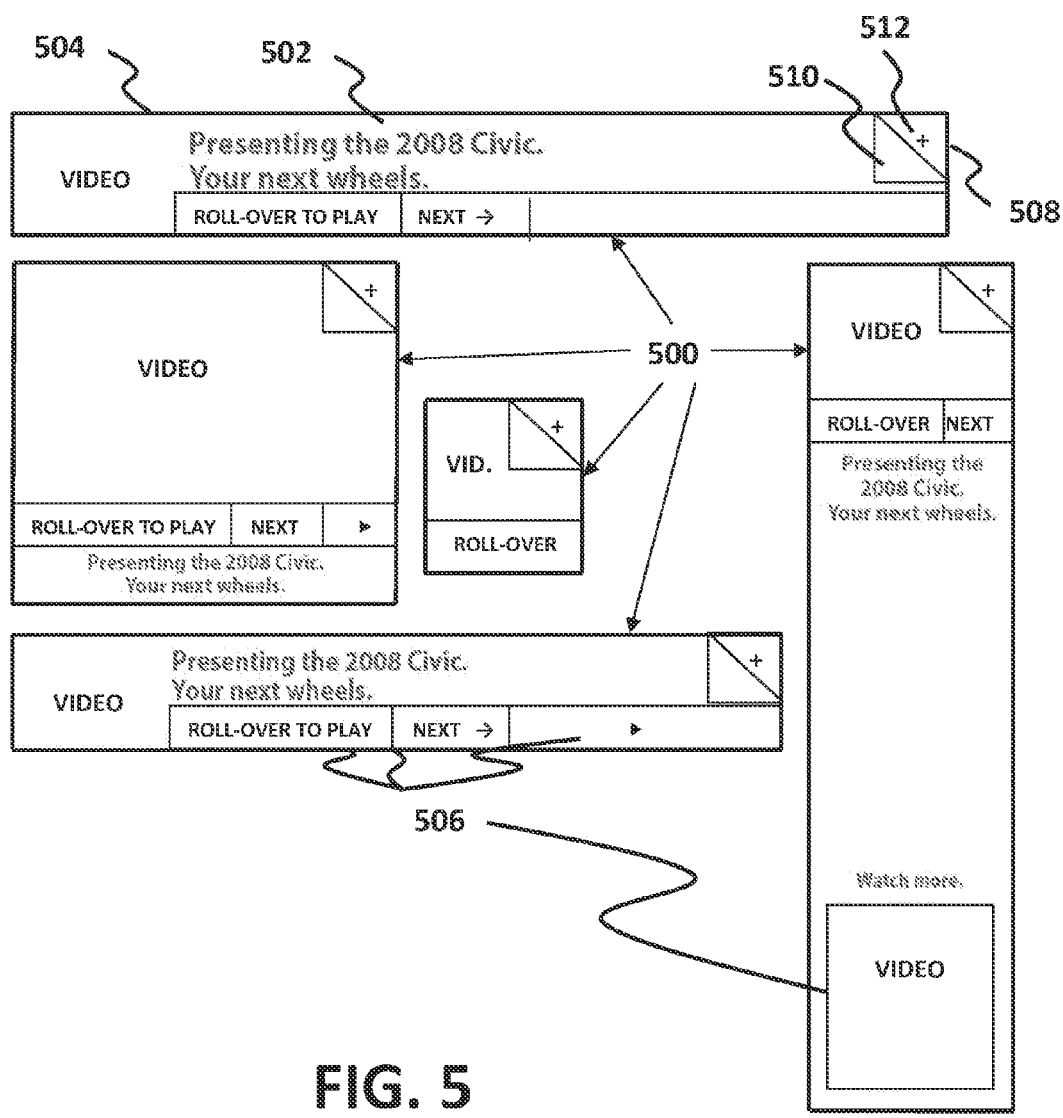
FIG. 5 illustrates a number of dynamically sized advertisement units, each including an engagement property and other features of an embodiment.

According to one embodiment, upon the user's interaction with the interaction prompt, a further advertising message is presented. For example, if the cola bottle was the interaction prompt, once the user clicked on the cola bottle, the invitation or teaser advertisement would transform into a full advertisement associated with the cola, either within the advertising region, or within all or some other part of the window. Once the user has experienced the full advertisement, the user would be able to close the full advertisement, as illustrated in FIG. 5 below, and return to the website or page or other area from which they started. When they do return to this area, the invitation they first viewed could be changed to represent some other advertised good or service, rather than continue to advertise the good/service with which they have already engaged.

As noted above, the cola bottle is just one example of an interaction prompt and the invention herein is hardly limited to just that example. Further interaction prompts include text (i.e., "Click Here to See Ad"), some other graphic (aside from the bottle) element, a playback control 400, a keyboard prompt, voice activation, etc. The types of interaction can vary greatly and could be different for different users depending on their psychographic data, demographic characteristics, or other factors, such as prior interactions with interaction prompts (i.e., if the user has only interacted with a particular type of interaction prompt in the past, the same type of interaction prompt may continue to be used for that user, versus switching to a different type).

Upon the user's engagement with the interaction prompt, a number of other different actions could occur in addition to presenting the user with a full advertisement. If the user was watching a video or some other form of content within the window at the time of the interaction, the viewing or navigation interface could be placed in a suspended state (i.e., paused). In one embodiment, such pause may be for the duration of the advertising message, until a user action occurs, or for some other duration. Of course, not all users will necessarily appreciate having the content they are viewing disrupted by an advertisement that they may have inadvertently engaged with by doing something as innocuous as moving their mouse. In one embodiment, the interaction prompt provides the user with a warning or counter to let the user know that what they are doing within the window is causing an advertisement to engage and that something will happen shortly if they do not do something to change the situation.

For example, as illustrated in FIG. 5, which shows a number of differently sized advertisement units (invitations or teasers) 500 comprised of text 502, images 504 and elements 506, an interaction prompt 508 (one of a possible plurality of engagement properties) is located at the top right corner of each advertisement unit. The interaction prompt is comprised of a turned corner 510 and an engagement warning or indicator that includes a change symbol 512 as the warning device. The turned corner 510 makes the advertisement look as though it is made of paper and that the upper right hand corner has been bent forward as if to turn the page. The turned corner 510 gives the user the visual image that there is something else behind the advertisement that could be reached by interacting with the upper right hand corner.

The engagement warning and change symbol 512, in this case a "plus" sign, warns or indicates to the user that there is something more associated with the advertisement. For example, the plus sign can warn the user that engaging with the advertisement unit 500 could cause the advertisement to change in some way, such as expanding, increasing or growing. Other stylized symbols could be used in place of a standard plus sign to indicate expansion, such as two intersecting curves that appear to form a plus sign, or many other variations that indicate expansion, growth or that something more might occur if the user interacts with the symbol. An expansion is just one way in which the change symbol 512 could change to warn the user. For example, as further discussed below, the change symbol 512 might be a minus sign to warn the user of a contraction if the symbol was engaged, or a counter to warn the user of the passage of time. Many other possible ways to warn the user are possible.

Thus, the user is presented with a number of visual clues that engagement with the interaction prompt 508 or the advertisement unit 500 might cause something to happen. As noted above, rather than simply having the advertisement units become active (i.e., change, start to play video or music, take over the window in which they are displayed, expand in size in some way, etc.) when the user moves the mouse over the interaction prompt 508 or over the advertisement unit 500, the interaction prompt could be used to provide the user with a warning or notice of engagement. For example, the change symbol 512 could change from a "plus" sign to a number, such as the number "3", when either the engagement prompt 508 or the advertisement unit 500 was moused over by the user. If the user continued to hold the cursor over the prompt 508 or unit 500 for more than a predetermined period of time, such as one second, the number "3" might change to the number "2". If the user continued to hold the mouse over the prompt 508 or unit 500 as the countdown continued, the advertisement would become fully active, such as by pausing the other content being viewed and expanding to take over more visual space on the user's computer display.

While the counter method described above is particularly intuitive, the systems and methods of embodiments are not limited to just a counter technique. Many other forms of user engagement warning or notices could be utilized. One significant value of the engagement warning is that it gives users an opportunity (a period of time) to decide whether they want to engage with the advertisement without any significant change occurring in the meantime. Many prior art techniques cause an immediate change, such as expanding the advertisement, stopping a video from playing, redirecting the user to a different website. Many users find such techniques to be bothersome and annoying. The engagement warning of an embodiment avoids this problem.

Figure 6:
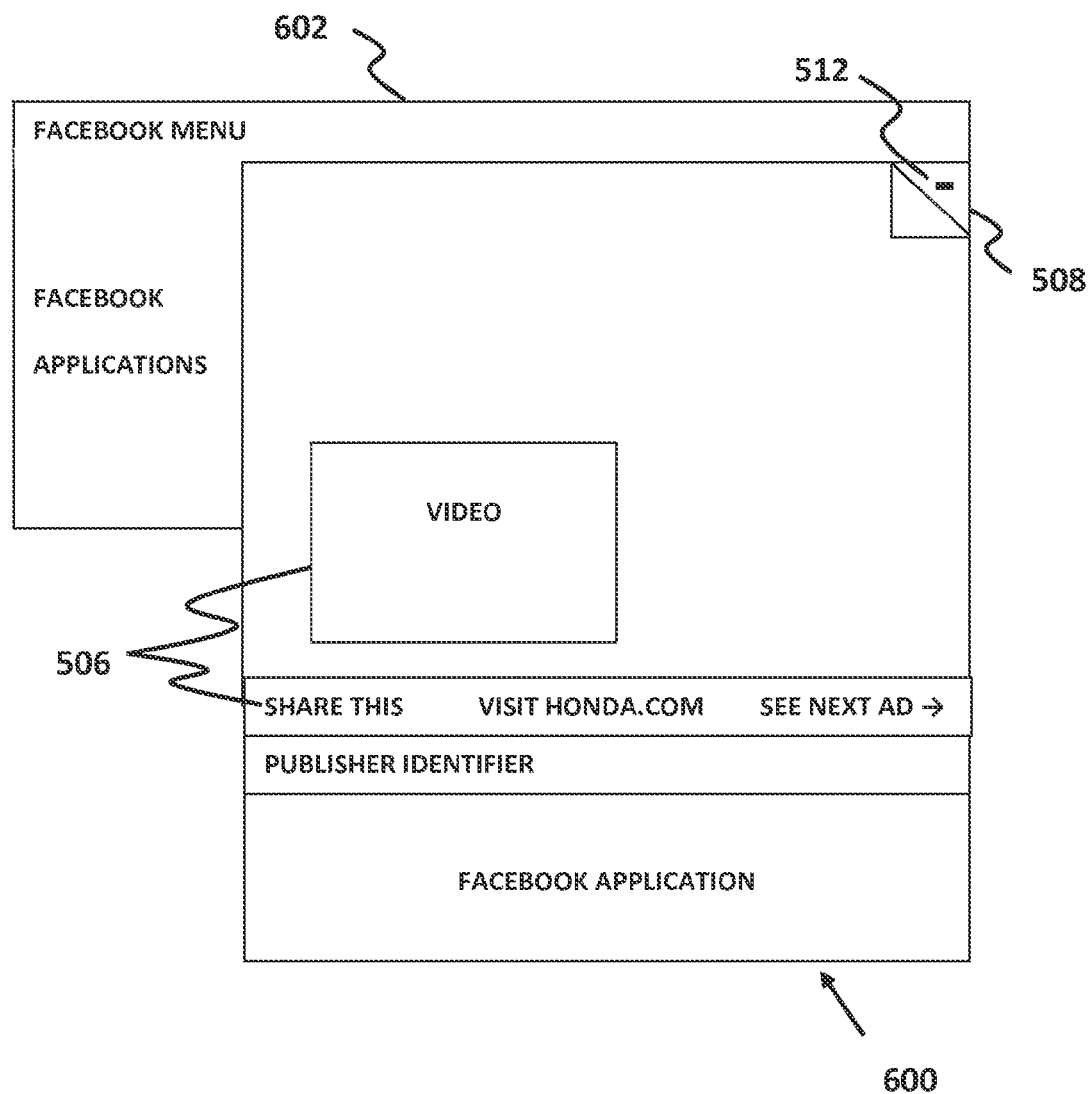
FIG. 6 illustrates an expanded advertisement from FIG. 5 within a website application.

FIG. 6 illustrates an expanded advertisement 600 within a website application 602, according to one embodiment. FIG. 5 provides an advertisement 300 for a HONDA CIVIC automobile. If the user engages with one of the advertisement units 300, the advertisement 300 might expand into the advertisement 600, as illustrated in FIG. 6. In FIG. 6, the advertisement 600 for the automobile has expanded to cover most of the content otherwise normally available on the user's website application 602, in this case a webpage within FACEBOOK. The change symbol 512 in FIG. 6 has changed to a "minus" sign to indicate that the advertisement is fully expanded and that the advertisement can be reduced to its original size by interacting with the change symbol 512 (i.e., clicking on the "minus" sign).

The expanded advertisement shares other features, in addition to the interaction prompt 508, such as elements 506. As an aside, although not shown in the figures, the visual transition that occurs between an advertisement unit and an expanded, active or full advertisement gives the developer of the advertisement an opportunity to identify itself. After a countdown passes or some other action has occurred that causes an advertisement to transition, the advertisement developer could briefly display its logo, name or some other identifier so that a user would be able to identify the entity that created the advertisement.

Returning to FIGS. 5 and 6, elements 506 enable the advertisement units 500 or expanded advertisements 600 to have a number of additional functions and to extend or otherwise expand the user's experience. As illustrated in FIG. 5, one element 506 instructs the user to "Roll-over" or "Roll-over to play" (some units 500 and advertisements 600 also include the universal "play" button to illustrate this feature to English and non-English readers). If a user rolled-over this element 506, then the image 504 could be transformed from just an image into video, or the unit 500 could be expanded to a larger advertisement 600. Another element 506 instructs the user "Next" and includes an "arrow" button to further illustrate this feature. Selecting the Next element would cause the advertisement 500 to be replaced by an entirely new (the "next") advertisement that had already been cued up and was ready to play in the event the next element was selected. Thus, if a user liked one advertisement, the user might be interested in engaging with additional advertisements from either the same advertiser, or related to the same product, or from the same publisher, etc. As previously mentioned, the next advertisement could also be for a completely different advertiser. After the "next" advertisement, there could be more next advertisements cued up and ready to become active, and on and on until all of the advertisements that could be shown were shown to that user.

Another element 506 might allow a user to watch a different video associated with the unit 500, or do other things, such as turn sound on or off, bookmark or save the advertisement, provide feedback, or control other aspects of the user's experience. For example, in FIG. 6, elements 506 enable the user to share the advertisement with a friend by opening an email application that can be used to email the advertisement to anyone. Elements 506 could also be used to enable the user to visit the advertiser's website (i.e., HONDA.COM). The number of element 506 functions that could be developed to expand or extend the user's experience is limitless, but a few related or additional examples are provided below with respect to FIGS. 7 to 12.

Figure 7:
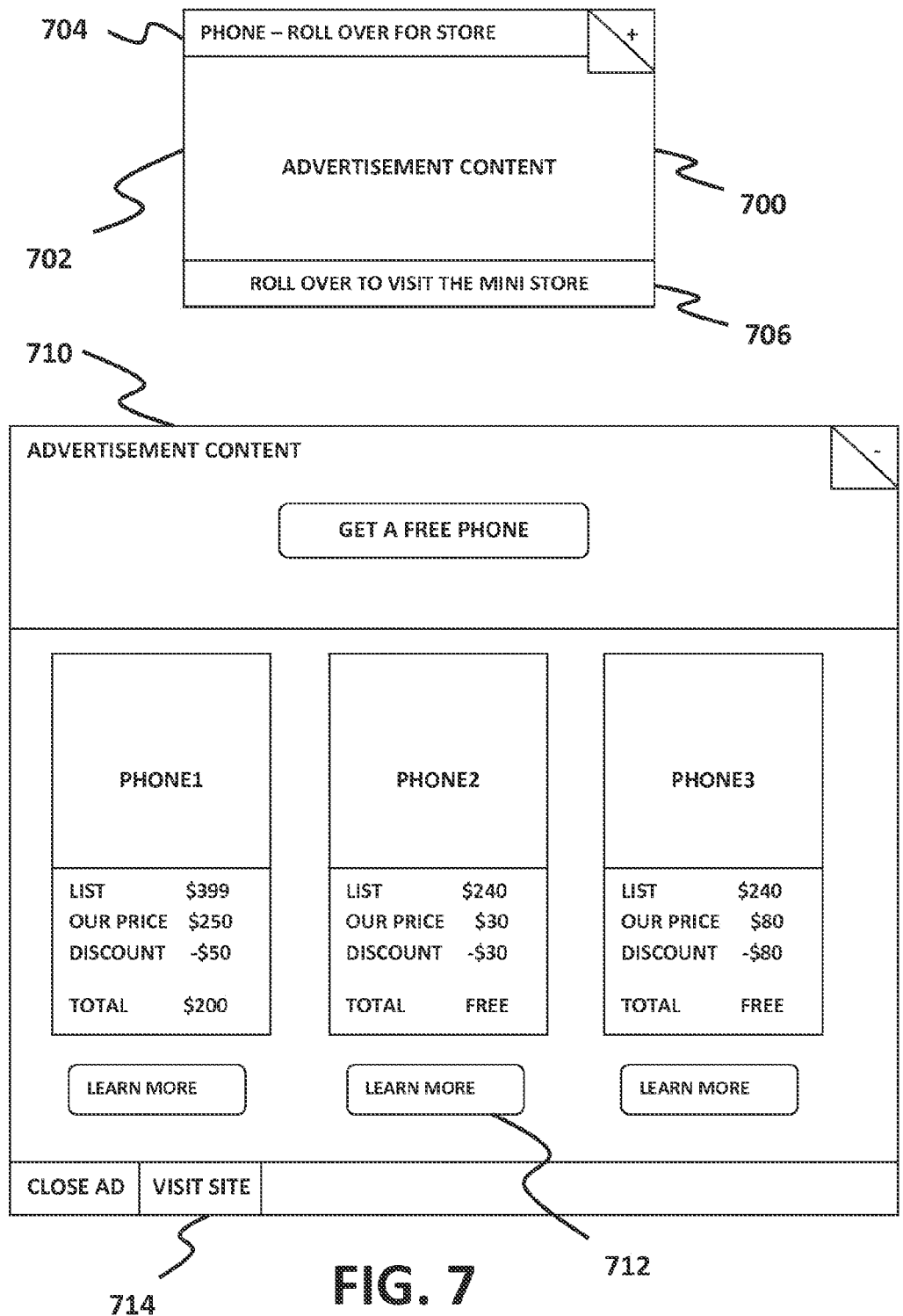
FIG. 7 illustrates a mini store invitation and expanded mini store advertisement in accordance with an embodiment.
Figure 8:
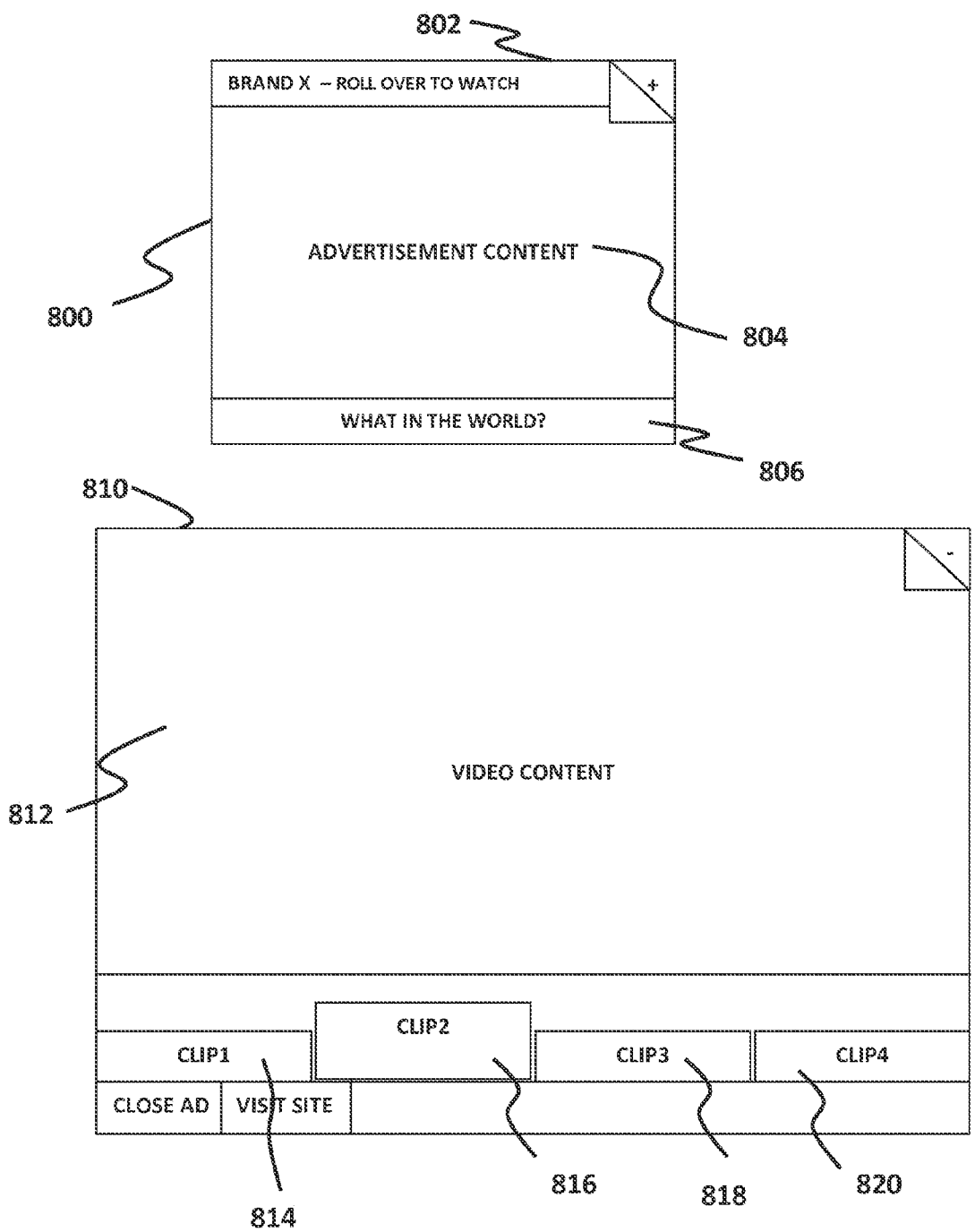
FIG. 8 illustrates a teaser advertisement and an expanded advertisement that uses readily navigable widgets to deliver additional content in accordance with an embodiment.
Figure 10:
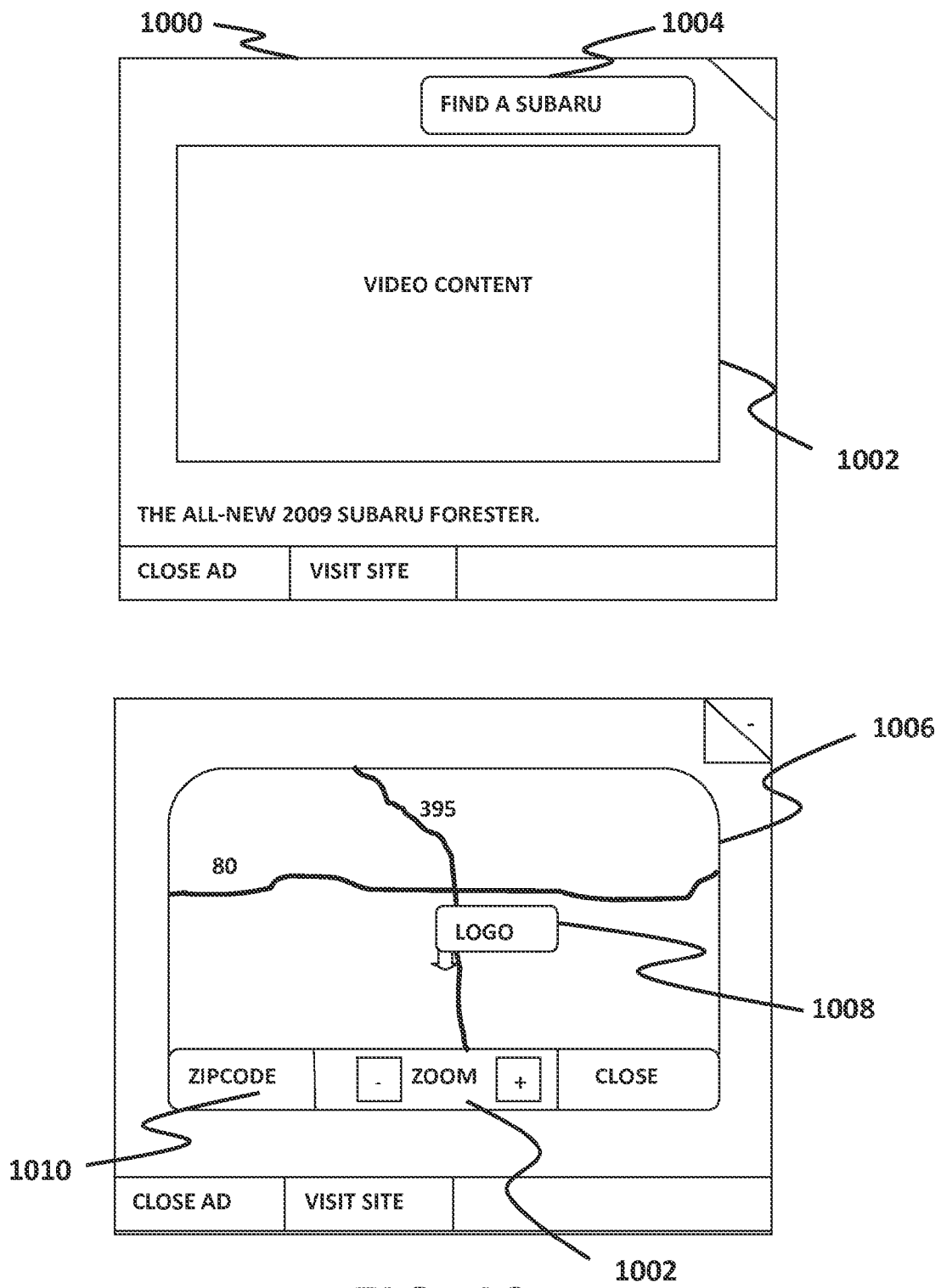
FIG. 10 illustrates an invitation and an expanded advertisement with a localization feature and a map widget in accordance with an embodiment.

FIG. 7 illustrates an invitation advertisement 700 for a phone company mini store that includes some kind of advertisement content 702, a title 704 with instructions on how to interact with the advertisement 700, and other engagement devices 706. The engagement devices can include a share tool, such as illustrated in FIG. 6, a localization tool or service, such as illustrated in FIG. 10, and a plurality of widgets, such as illustrated in FIG. 8, that display advertising content or information to the user and that can be navigated.

The share tool enables the user to send the interactive advertisement to a different computer. In an alternative embodiment, the share tool formats the interactive advertisement so the interactive advertisement will operate properly on the different computer.

In an embodiment, the plurality of widgets can be navigated by the user to access a plurality of the second set of media assets. Alternatively, the second set of engagement devices can include a share tool also enables the user to send one or more second media assets from the second set of media assets or one or more second engagement devices from the second set of engagement devices to a different computer.

In an embodiment, the first set of media assets, or the second set of media assets, or both the first set and the second set of media assets include a widget and the share tool formats the widget to be embedded in the different computer. Alternatively, the first set of media assets, or the second set of media assets, or both the first set and the second set of media assets include a widget and the share tool formats the widget as an attachment to an email message. In yet another embodiment, the first set of media assets, or the second set of media assets, or both the first set and the second set of media assets includes a widget and the share tool embeds the widget into an email message.

In an embodiment, the second set of engagement devices and the second set of media assets can be removed from the interactive advertisement by the user and used in a different location on the computer or on a different computer. Alternatively, the first set of engagement devices and the first set of media assets can be removed from the interactive advertisement by the user and used in a different location on the computer or on a different computer.

In yet another embodiment, the second set of media assets include one or more dynamic media assets, wherein the dynamic media assets include one or more localized media assets, wherein the second set of engagement devices include a localization tool that detects an IP address used by the computer, traces the IP address to a zip code, and informs the advertisement manager of the zip code, and wherein the advertisement manager selects localized media assets that correspond to the zip code from a dynamic content source. Alternatively, the first set of media assets include one or more dynamic media assets, wherein the dynamic media assets include one or more localized media assets, wherein the first set of engagement devices include a localization tool that detects an IP address used by the computer, traces the IP address to a zip code, and informs the advertisement manager of the zip code, and wherein the advertisement manager selects localized media assets that correspond to the zip code from a dynamic content source.

In an embodiment, the first set of media assets includes a plurality of different advertisements that are to be separately presented to the user and the first set of engagement devices includes a next advertisement tool that enables the user to move through the plurality of different advertisements.

When a user engages with the advertisement 700, it expands into advertisement 710 that provides a mini store where users can browse through numerous different products, in this case a number of phones, see the pricing for the offered products, and purchase or learn more about the products. For example, selecting the "Learn More" button 712 under Phone 2 might take a user to another website with more information about Phone 2, such as its features, or might take the user to an on-line purchasing page where Phone 2 can be purchased. Alternatively, if a user was interested in the advertiser (the phone company), but hesitant to buy from the advertisement, the user could select the "Visit site" button 714 and go directly to the phone company's website.

FIG. 8 illustrates an invitation advertisement 800 for Brand X, which includes a title 802, some form of teaser content 804 to interest the user, and other engagement content 806, in this case the provocative phrase "What in the world?" When the user engages with the advertisement 800, it expands into advertisement 810 that includes a video advertisement 812 and a number of easily navigated widget-based tabs 814 to 820. Advertisement 800 is meant to provide the user with the ability to view multiple different pieces of content while within a single advertisement 810. While one video or other form of advertisement content was being displayed, in this case Clip 2 of widget tab 816, the corresponding tab is raised above the other tabs so the user knows which one is playing. To select different content, the user would mouse over either widget tabs 814, 818 or 820 and select one of those tabs, or interact with them in some other appropriate manner. This advertisement formats allows the advertiser to present significantly more content to a user, without requiring the user to exit the webpage or website they were at when they engaged the invitation advertisement.

The widgets may also be presented as push buttons or menus that expand horizontally or vertically when pressed. The widgets may also be enhanced with various graphic displays in order to encourage the user to interact with the widgets. For example, the widgets may glow, starting with a bright background color or border color, fading slowly to a softer color, and again slowly increasing in color brightness. The widgets may also become animated when the user moves the mouse over the widgets. For example, a widget may jitter in place while the user moves the mouse over the widget.

Figure 9:
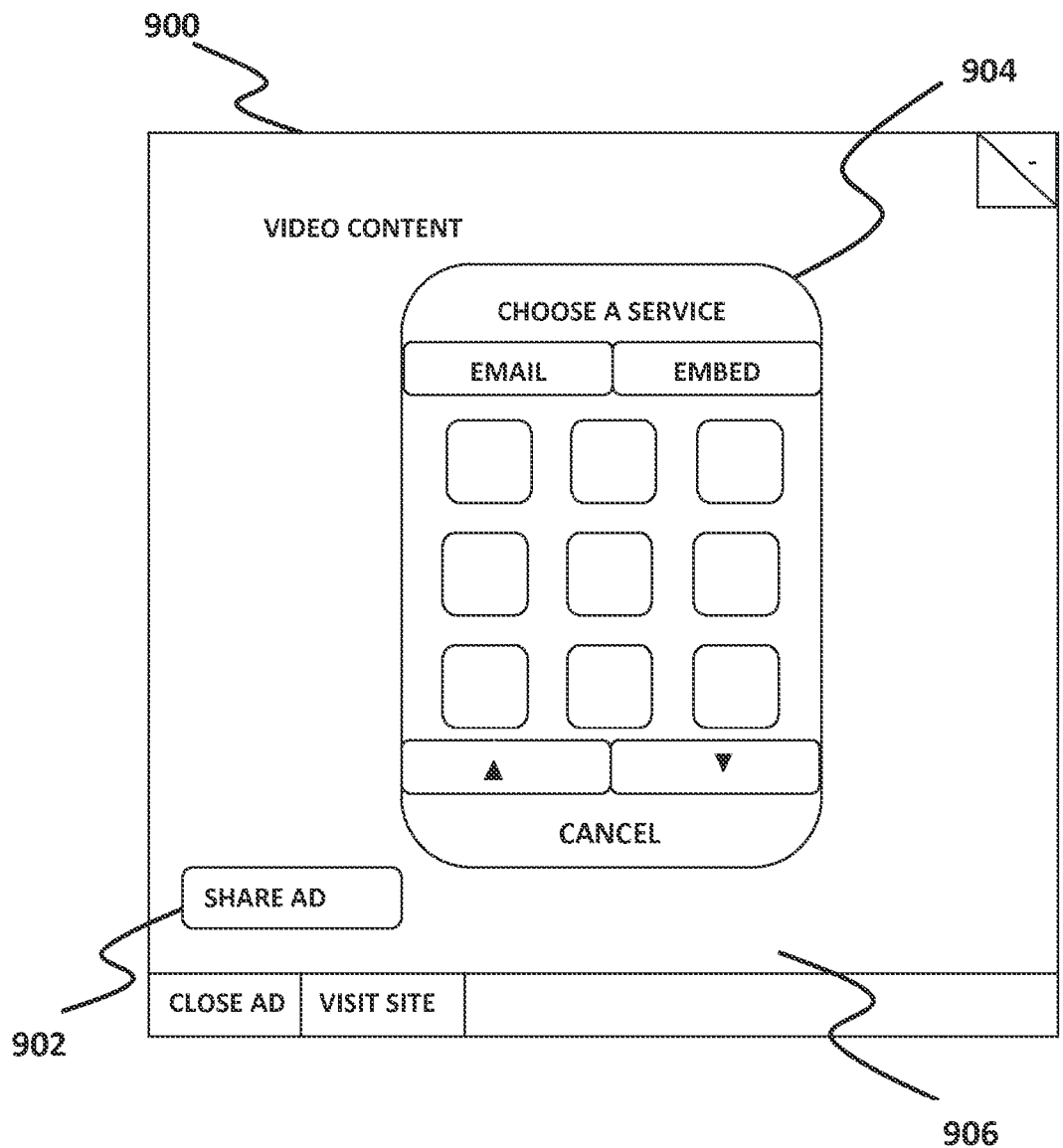
FIG. 9 illustrates an expanded advertisement that enables sharing or saving of some component of the advertisement or the entire advertisement through operation of a widget in accordance with an embodiment.

FIG. 9 illustrates an advertisement 900 that enables the user to share with, or push the advertisement 900 to other people by using the share tool. The share tool can consist of a hyperlink, a button 902, or some other widget that allows the user to share the interactive advertisement, or part of the interactive advertisement content, to a second user or to a second computer. FIG. 9 is an example of the share tool consisting of a button. When the user selects the "Share ad" button 902, at any time, a widget 904 will appear in front of the advertisement content 906 (which may be paused or suspended as a result). The widget 904 allows the user to email the advertisement 900 (including any video, widgets, engagement features and other content) to another person (through the user's default email application) or embed the advertisement 900 in a blog, social networking website or other host environment, such as the MYSPACE website, FACEBOOK website, etc. To simplify the process of emailing the advertisement 900, the widget 904 will prepare the advertisement 900 as an attachment to an email, embed it within the body of an email message, or provide a link to the advertisement that can be inserted into an email message. To simplify the process of embedding the advertisement 900 in any of a large number of other environments, the widget 904 will prepare the advertisement 900 based on the host environment selected by the user from a scrollable list. When a host environment is selected, the user will either be presented with the code or other tools needed to insert the advertisement 900 into the desired host environment.

FIG. 10 illustrates an advertisement 1000 that includes a localization service or tool that enables the publisher to push local experiences into the advertisement. The localization service captures the Internet Protocol (IP) address for the user and traces that to a zip code, city, or region that corresponds to the user's physical location. The user can then be presented with information relevant to the advertisement that has a local connection to the user. For example, advertisement 1000 plays a video 1002 for the 2009 SUBARU FORESTER automobile and invites users to find their local dealer by selecting the "FIND A SUBARU" button 1004. When the user selects button 1004, a map widget 1006 opens that shows the user where the nearest dealer is to the user based on the zip code traced by the localization service. As illustrated in FIG. 10, the user is physically located in the Reno/Sparks area of Nevada, and a dealer, as indicated by the icon 1008, is located near highway 395 just south of the highway 395/highway 80 interchange. Since IP addresses do not always trace to the exact location of the user, the map widget 1006 includes a zip code entry section 1010 so the user can manually enter a zip code and a zoom feature 1012, so the exact location of the dealership can be located. Alternatively, the map widget may consist of an embedded third party mapping website, such as GOOGLE Maps or YAHOO! Maps, that allows the user to zoom in and zoom out, and to move the map around, allowing the user to pinpoint the location with the mouse.

Figure 11:
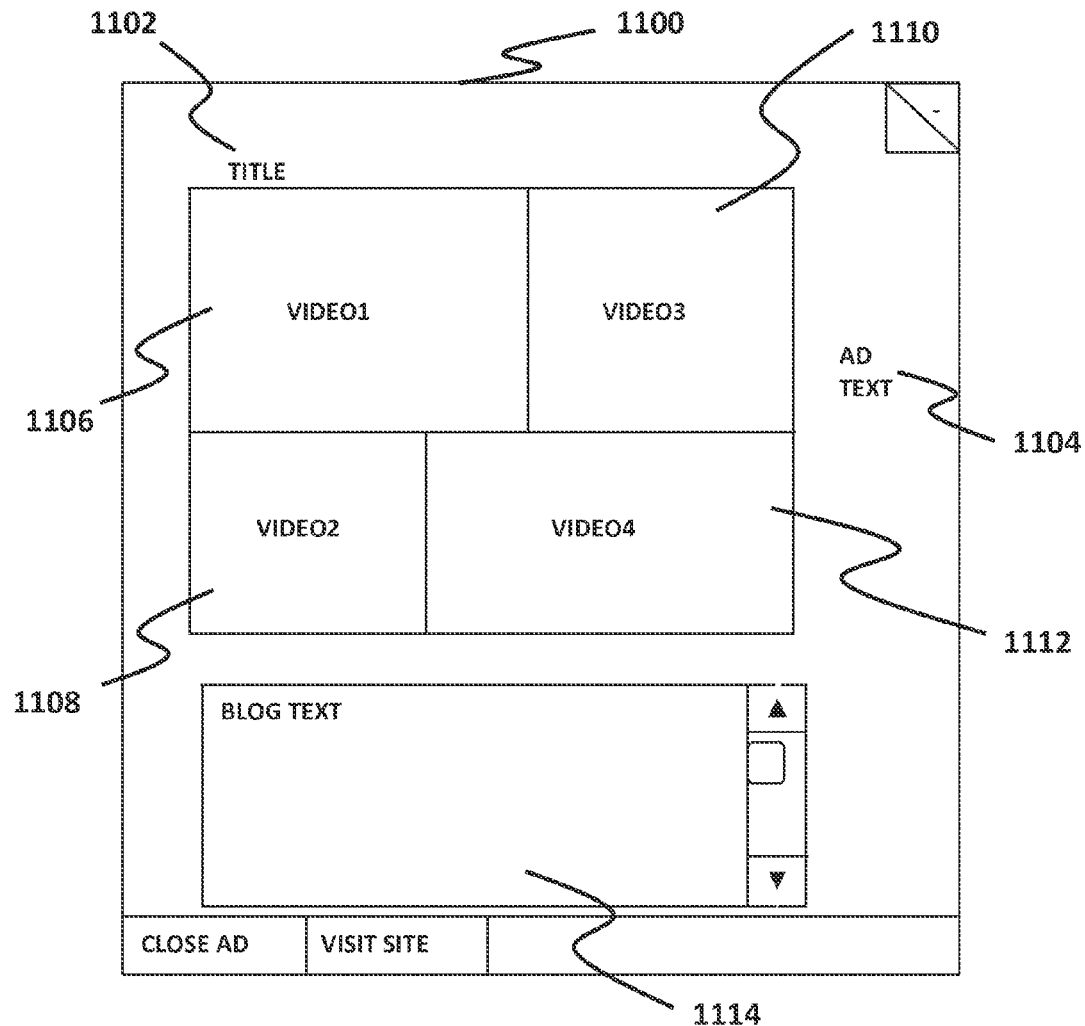
FIG. 11 illustrates an expanded advertisement with dynamic components in accordance with an embodiment.

FIG. 11 illustrates one example of a dynamic content advertisement 1100. The expanded advertisement 1100 includes a title section 1102, some advertising text 1104, four video areas (video1 1106, video2 1108, video3 1110 and video4 1112), and a blog text section 1114. The video areas depict four different video scenes, each of which might be driven from a live video feed, such as streaming video. The blog section 1114 includes text that is being fed into the advertisement 1100 through an RSS feed. Any other frequently updated content could also be fed into the section 1114, such as pod casts, news headline, stock quotes, etc. In FIG. 11, a series of blog entries are listed in section 1114. Although one is shown, a user could access the other blog entries by moving arrow keys on their keyboard, clicking a selection button while they are moving the mouse over the section 1114, etc.

Figure 12:
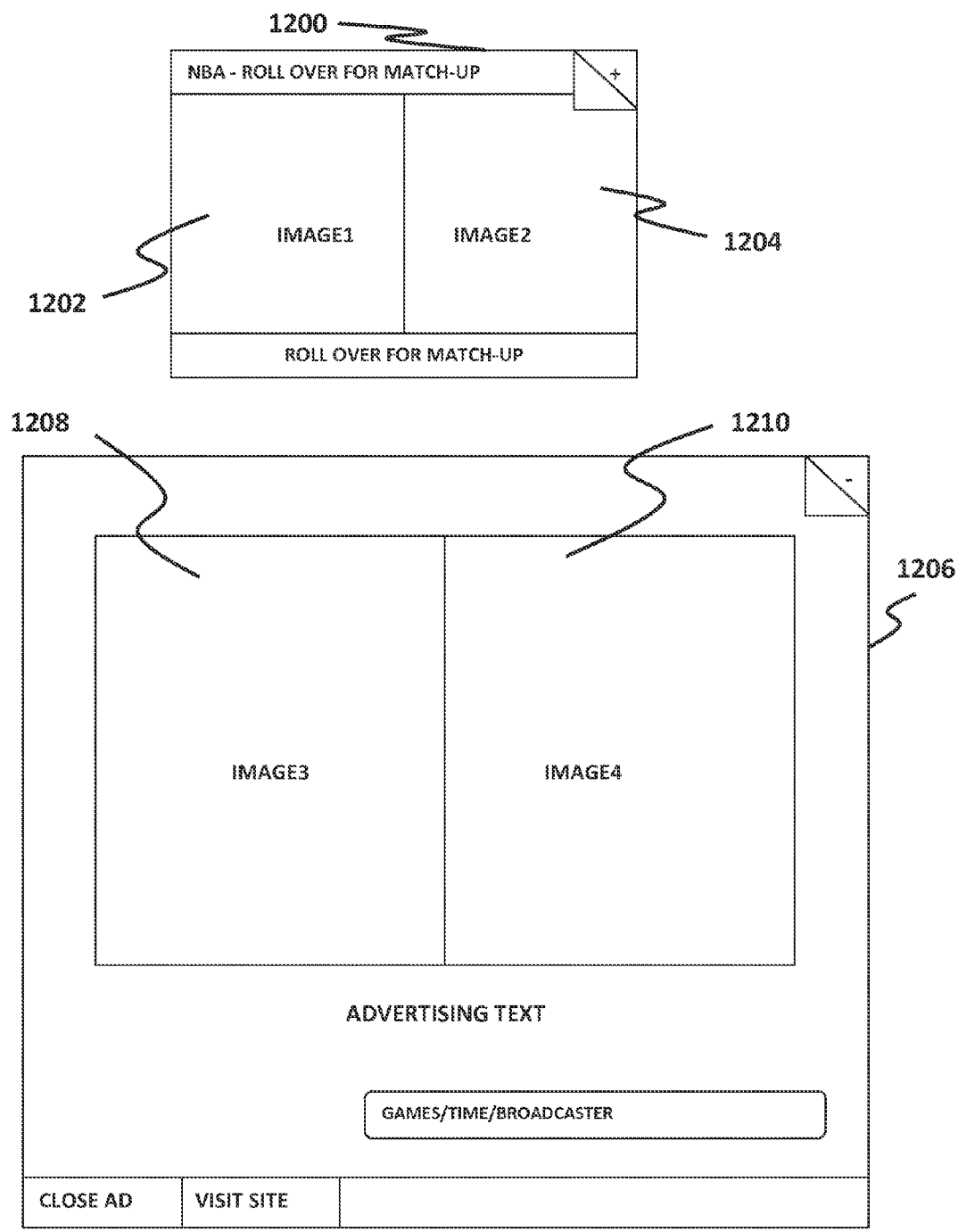
FIG. 12 illustrates an invitation and an expanded advertisement with dynamic components and localization features in accordance with an embodiment.

FIG. 12 illustrates another example of a dynamic content advertisement. In FIG. 12, invitation or invitation advertisement 1200 is an advertisement for the National Basketball Association (NBA) finals. It illustrates two images: image1 1202 includes a picture of one basketball player (or a logo or similar representation) from one team; and image2 1204 includes the picture of a different player, logo, representation, etc. from a different team. Illustrating the images of different basketball players from different teams is meant to express the competition between the opposing teams. If the user engages with the invitation 1200, the full advertisement 1206 opens and displays additional content, which might include the images (1208 and 1210) of more players, video footage of the teams playing, etc., and includes the names of the teams that will be playing, what time they will play, and what broadcaster is carrying the game. Combining this RSS feed data with a localization service would enable the playing time to be adjusted for the user's actual time zone. Additional dynamic data, such as other games being played, etc. could also be displayed, such as in area.

In addition to the dynamic advertising elements discussed above, many other dynamic elements could be utilized in an advertisement, such as a widget, a real-time or downloadable application, a dynamic micro-site (i.e., a mini-site or weblet that is comprised of a web page or cluster of pages), a slide show, etc. The content illustrated also need not be static, whether in the original or expanded form. Hence, the images or text or other elements within an advertisement unit could be changed on some periodic basis, such as after a period of time, after the user's cursor has spent so much time over the element in question, after the user has engaged with the advertisement in some other way, or in many other ways, as further noted below. Further, as noted with respect to the share feature of FIG. 9, the advertisements or the elements of the advertisement can be capable of independence from the website 222 or other environment in which they first displayed. For example, if the advertisement was created as a stand-alone application or as a micro-site, versus being delivered by the browser, it could be removed (i.e., downloaded) from the website on which it appears and used on its own in many other environments, e.g., dragged and dropped onto a desktop or other storage area, emailed or shared with others, embedded in other electronic documents, etc.

As noted above, some or all of the components of the advertisement, versus the advertisement as a whole, could also have independence. For example, a user may be able to grab a component of the advertisement, such as a widget, an application, a slide show, etc., and drop it onto their desktop or some other location, or otherwise downloaded in some form. Preferably, the component would include some indicator of the advertiser or the good/service being advertised. A video, an animation, music, etc., that could be removed from the advertisement and used in other ways could significantly enhance the value of the advertisement to the advertiser. Once removed from the advertisement, the component could express additional independence and could be re-sizeable and changeable in other ways.

Having described some of the various types of advertisements that could be generated, the components and content of such advertisements, and some of their many features, it is now necessary to describe the manner in which advertisements are generated, such as in the context of the architecture illustrated in FIG. 2. To generate an advertisement in a webpage or flash player, for example, a request must be made for the advertisement to be inserted in the webpage or player, such as player 208. The application making the request or call is referred to herein as the calling application. The calling application could come in many different forms: (1) a standard website or web application that is based on HTML, JAVASCRIPT or CSS code; (2) a rich-media application delivered via a web-based plug-in, such as a ADOBE FLASH plug-in; (3) a rich-media component of a web application, such as a FLASH or QUICKTIME-based video player, embedded game or widget; (4) a mobile application, such as an IPHONE or mobile JAVA application; or (5) any other Internet connected application.

In one embodiment, the calling application makes a request or call to the advertisement manager 225 to embed an advertisement in the webpage or player via an application programming interface (API) provided by the advertisement manager 225. The advertisement manager 225 is a collection of code that manages the user's advertising experience, including loading the XML file, referred to above, from the advertising servers 226, and rendering the advertisement as part of the calling application (in this case player 208). Although the advertisement manager 225 is shown in FIG. 2 as part of the player 208, the advertisement manager 225 is a code library that could reside in any of a number of places within the user's computer 200 or elsewhere that is accessible to the user's computer 200. For example, the advertisement manager 225 could be a FLASH file loaded into the player 208 that is application specific (e.g., .swf).

The API of the advertisement manager 225 allows the calling application to pass on targeting data, such as the user's age and gender, and specifics on what kind of advertisement it wants, such as the available size or particular advertisement types. The code and structure of the API varies depending on the type of calling application. For example, the API for a video player may be totally different than the API for a web application, which may be totally different than the API for an IPHONE application. The API can also provide extra functionality, such as instructions regarding how an advertisement should be shown, instructions for hiding an advertisement, or a callback for informing the calling application that an advertisement has been shown or is being shown.

Once a request for an advertisement has been made to the advertisement manager 225 from the calling application, the advertisement manager 225 would then make a request to the Advertising Server(s) 226 to get a particular advertisement and, in the process, pass along any data about the user, the kinds of advertisements that are allowed, the available size and other data. The advertising server 226 then picks an advertisement from a set of available advertisements based on the incoming data and other internal data, such as which advertisements perform best, which advertisements make the most money, how many of each advertisement it is supposed to deliver, etc. Once the advertising server 226 has selected an advertisement to send to the calling application, the advertising server 226 will return a file to the advertisement manager 225 to the calling application. This file includes advertising metadata corresponding to the selected advertisement. The form of the file varies depending on the type of calling application or the type of the advertisement, but is most often an XML file and is referred to herein accordingly.

The advertising metadata defines the various elements (including text, image, video or other rich-media elements) to be used in a particular advertisement. The advertising metadata also describes how those elements should be displayed, what engagement data for that advertisement should be collected and where it should be sent, and other data necessary to render and track the advertisement. Although the advertising metadata describes how elements should be displayed, it does not control how the elements will actually be displayed on the user's computer 200, which is managed by the advertisement manager 225. For example, to display an advertisement on a user's computer 200 comprised of a video and a headline of text, the advertisement manager (typically JavaScript and/or ActionScript) running on the user's computer ("client-side code"), would read the XML file (including the advertising metadata) to determine what content to use (i.e., the video and headline), download that content from the advertisement servers or the content delivery network, and determine where to put the video and the headline (and how big to make them) based on the space (i.e., size and shape) available for the advertisement.

Upon receipt of the XML file, the advertisement manager 225 parses the advertising metadata and loads any advertising media assets referenced in the advertising metadata from an advertising media server (advertising servers 226). Advertising media assets are media elements (media files) used in an advertisement, such as images, videos, flash games, etc. The advertising media server is a web application that is capable of delivering the advertising media assets, which are referenced by the advertising metadata by their retrieval location (such as a URL) within the advertising media server. The advertising media server can reside on any web server, collection of web servers, or a network (such as the content delivery network 224), and may or may not be on the same physical server as the advertising servers 226.

Once the advertising media assets have been loaded, the corresponding advertisement can be displayed to the user. How and when the advertisement manager 225 loads the advertising media assets and displays the advertisement varies based on the advertisement type, the calling application, the available space, and other factors. For example, if the available space is very small, the advertisement manager may choose not to display all of the advertising media assets for the advertisement or to reduce the font size, or if the calling application is a video player, the advertisement manager may choose not to display the advertisement until a certain amount of the video has been played. Likewise, based on the time of day, or the passed on data regarding the user's age, gender, location, etc., the advertising media assets might be varied.

As a result, the advertisement unit is not limited to the standard formats specified by the IAB, but rather can be dynamically sized and structured to work in any space provided. As shown in FIG. 5, the text 302, images 304, elements 306, and interaction prompt 308 of the advertisement unit 300 can be sized, arranged, altered, left out, or added to as needed to form an advertisement for any situation. Thus, an advertisement could be created for any standard sized advertisement unit as well as any non-standard size unit by having the advertising manager 225 decide what advertising media assets best fit within the space provided for the advertisement and then arrange those assets accordingly.

If there is very little space for the advertisement, then it may only be comprised of a line of text 302 (or just a word) and an interaction prompt 308 (which may be the word itself or some other visible or invisible element). For example, a crown unit (i.e., an advertisement which sits on top of other content) could be dynamically generated in a very constrained space that may only allow for a single word or line of text in a small font or a single image or graphic. With a little more space, it might be possible to add an image 304 or larger image. An even large space could allow for a larger version of the same image 304, the text 302 in a bigger font, additional text, various elements, a video box, etc. Any of the advertising media assets of the advertisement unit could be dynamically refreshed once the advertisement was generated, or selected in some sort of dynamic fashion so that different users seeing the same advertisement at the same time might get different content/assets, or even the same user seeing an advertisement for the same thing might get different content/assets each time.

As noted above, any component of the advertisement specified by the XML file could also be dynamic. For example, any advertising media asset could be supported by an RSS feed, thereby enabling that asset to be frequently updated or modified. The advertisement manager 225 may also make subsequent (even frequent) requests to additional servers for dynamic advertising data, to replace content, or to implement extra functionality. For example, as illustrated in FIG. 12, if an advertisement is for a television show or game, the advertisement manager 225 may make a request to a server for the show's/game's air time in the user's time zone, which could then be displayed with the advertisement. Extra functionality, such as the ability to send an advertisement to a friend via email, might be accomplished by having the advertisement manager 225 contact an email server for processing the email, as illustrated in FIG. 9.

These various advertisements can also be constructed from reusable structural and/or advertising media asset components. For example, an animation used in a ticker advertisement (an advertisement shown in a ticker, i.e., a small area that overlays or obstructs content) for one advertiser could be used by the same advertiser in a different type of advertisement, or even a different advertiser for a different product/service. This can be accomplished by having multiple XML files specify the same media asset(s). These same media assets would then be downloaded from the advertising media server (i.e., content delivery network 224) for use in the different advertisements. Other types of advertisements that can be specified to the advertisement manager by the XML file include, without limitation:

- a pre roll advertisement (i.e., an advertisement shown to the user before showing the content the user requested);
- a post roll advertisement (i.e., an advertisement shown after the user completes viewing the desired content.);

a mid roll advertisement (i.e., an advertisement shown in the middle of the desired content.); and a menu advertisement (i.e., an advertisement show in an interface inside the video player where the user is selecting additional content or accessing additional functionality like emailing or embedding the player).

In addition to playing or helping to facilitate the presentation or playing of an advertisement, the advertisement manager 225 serves other purposes. The advertisement manager 225 can be used to track user events, such as each instance where the user pauses or plays the content, or when the content begins and ends. Thus, the advertisement manager 225 continues to control the advertising experience by managing the advertisement, running any animations or videos, checking for user interactions, and updating the advertisement as needed. The advertisement manager may also track certain events and send data on when or how the event occurred and send that information to an advertising data collection server for reporting or billing, as further described below.

The combination of the player 208 and appropriate coding with the advertisement servers 226, advertisement manager 225, and content delivery network 224 allows interactive advertisements to be provided to any websites that hosts a player 208 of any form. The present method and system also allows for advertisement to be structured, shaped and positioned in any manner that will invite a user to watch an advertiser's message.

Figure 13:
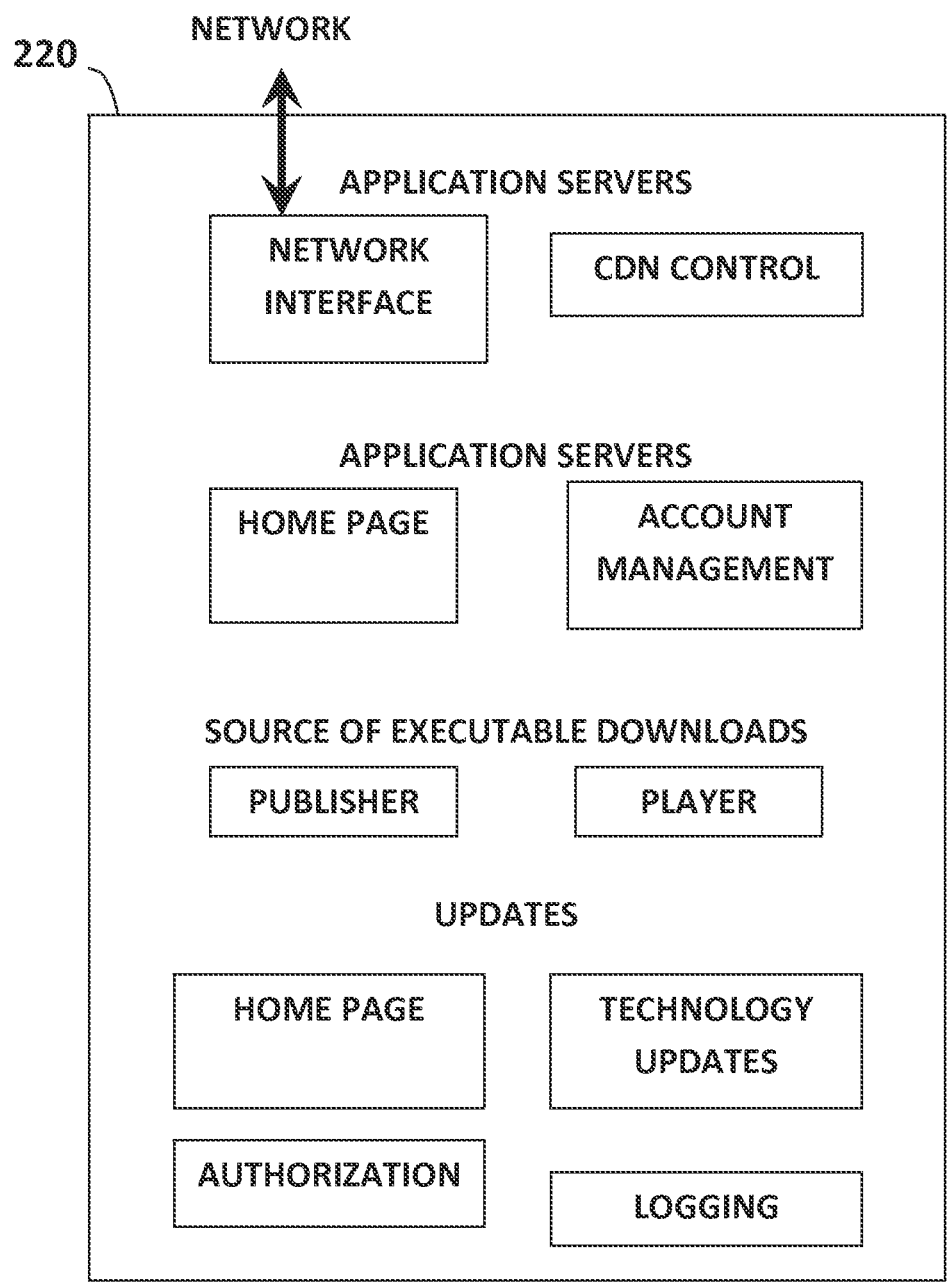
FIG. 13 depicts a block diagram of exemplary application servers of an embodiment.

The remaining major component of FIG. 2 is the application servers 220. FIG. 13 depicts a block diagram of an exemplary application server(s) 220, according to one embodiment. The application server(s) 220 may provide central control of certain system platform functions such as providing content delivery network 224 control, providing a central website for the publisher's home page, providing account management (including reporting server functions and collecting and storing data about users), providing a source of executable downloads for the player 208 browser plug-ins, providing automatic updates to player 208, providing logging of data flow and usage, providing authorization for use of the components of the system (such as uploading content to the content delivery network 224), providing other controls to facilitate the manipulation and viewing of content files, and providing the advertising data collection server. This latter server is a web application which collects engagement data. When a user interacts with a particular advertisement, the advertisement manager 225 notifies the advertising data collection server of the engagement, which in turns stores the data for future use. Data from the advertising data collection server can then be used to provide reports and to determine how much the advertiser should pay if the advertiser is paying on an engagement basis.

As noted in the Background of the Invention section, in the past, advertisers have been obligated to pay publishers for each advertisement primarily based on pay-per-impression (PPI) or pay-per-click (PPC) compensation models, even in the absence of any evidence that a user has paid any attention to the advertisements in question. Only paying publishers when a click through occurs (the other primary form of compensation), however, goes too far the other way in that it is not always reasonable or appropriate to expect a user to have to leave the website they are viewing to go to another website corresponding to the advertisement. An embodiment provides an alternative to PPI and PPC compensation models without requiring click through as a compensation alternative. An embodiment couples the engagement-based advertisement described above with a new compensation model that forces greater accountability on publishers and enables advertisers to more objectively measure the effectiveness of their advertisements.

In one embodiment, when a user engages or interacts with the displayed advertisement, such as by moving the cursor over the advertisement unit 500 or the interaction prompt 508 (or engaging in one of the other manners described above), the advertiser is assured that the user has seen the advertisement and paid some attention to it. Any act of engagement, and the level of such engagement, by a user can then be tracked and reported to determine appropriate compensation for a publisher. If the user's engagement is more than just passing, such as resulting in the advertisement becoming active, then the advertiser would be provided with an even higher level of assurance and the publisher might be paid an even higher amount of money. The money paid could also be based on different types of engagement and/or the amount of time spent by the user engaging the advertisement. For example, the passage of a mouse over the interaction prompt 508 might be paid at the lowest rate, while allowing the countdown to get to "2" or "1", but short of letting the advertisement become active, could be paid at a higher rate. Allowing the advertisement to become active would generate an even higher rate. A user's emailing or otherwise sharing of an advertisement could result in different revenue, including the resulting stream of additional viewers to whom the advertisement was sent or shared with, which could be tracked by the advertisement. A click through by the user to the advertiser's website might be compensated even higher. Likewise, a single user that uses the "next advertisement" feature to view multiple advertisements from the same advertiser could be priced at a different rate.

In an embodiment, rather than pay on a per user basis, engagements for multiple users over some period of time could be aggregated, with fees being based on aggregation totals or even percentages, e.g., 10,000 users moused over without further engagement, 5,000 partially counted down through the interaction prompt, 1,000 allowed the advertisement to become active, 500 clicked through, etc. Thus, many different means of tracking and reporting user engagement is possible and many different compensation schemes accordingly can result.

This engagement-based compensation model is more trustworthy than pay per impression-based models because user intent and interest in the advertisement is not inferred or assumed based on the mere display of an ad, but rather from true engagement with the advertisement—engagement being defined herein as interaction that falls short of a click-through. Further enhancements to the model include certain technological measures that avoid or account for "engagement" fraud that could be caused by manual or automated methods that appear to indicate engagement when no actual engagement by a user has occurred.

Potentially fraudulent activity includes engagements from known suspicious IP addresses or browser user agents, unusual engagement levels from particular users, unusual ratios of engagement types, unusual amounts of time between engagement types, etc. For example, if a user starts a video and then one second later finishes that video, that activity is probably fraudulent. Likewise, if a particular IP address shows lots of mouse overs, but no video views, or 100% video views, fraud could also be suspected. When fraudulent activity is detected or suspected, the advertisement manager 225 could disable the advertisement so no further engagement is possible. Alternatively, if fraudulent engagement with an advertiser's advertisement is detected, any engagement accounting associated with that advertisement could be adjusted by the amount of fraud involved.

Likewise, the model could be further enhanced through the application of an advanced advertising marketplace that allows advertisers to bid on the amounts to be paid per engagement, measured engagement, different type of engagement, etc., in an auction environment. This type of advanced marketplace, when combined with the engagement model of an embodiment, would allow advertisers to reach certain targeted demographics or other targeted criteria (such as noted above) with much greater levels of assurance and reliability than present models make possible. Under this model, advertisers are only obligated to pay when a user interacts with the displayed advertisement—not upon the mere display of the advertisement alone.

An embodiment of the present invention comprises a fixed position advertisement positioned anywhere on a portion of a web page currently being viewed by a user on a web browser window. The advertisement is described as having a fixed position because the advertisement remains in a fixed position and in view even as the user scrolls the web page. It is typical for web pages to require scrolling in order to view the entire contents of a web page due to screen size limitations of devices. For example, only the top part of a web page may be within view when the user visits a web page, requiring the user to scroll down in order to view the rest of the web page. Traditional advertisements placed within such a webpage scroll with the page and are quickly lost from view. The fixed position advertisement is placed in a position within the current viewable portion of the webpage that remains in view of the user even as the user scrolls the web page in various directions.

In one embodiment, an advertisement could be made to stretch across the full width, or height, of a web browser window, with the position of the advertisement remaining fixed either at the top, bottom, left, or right side of the browser window, even as the browser window is scrolled up, down, left, and right along the web page. The advertisement could also stretch a fraction of the full width or a fraction of the full height of the web browser window.

The fixed position advertisement is not limited to top, bottom, left, and right sides of the web browser window. The advertisement could also be fixed to any position of the web browser window, such as the bottom left corner of the web browser window, to the left of the main menu of a web page, etc. The advertisement could also be fixed so as to effectively float at some intermediate position on the web page as the page is scrolled, not the top, bottom, left or right, but somewhere in between. As such, it might cover up content on the web page that scrolls under it, or the content could effectively flow around the advertisement so that no content is covered. In addition, the advertisement could have a fixed size which does not stretch to fit the width or height of the web browser window. For example, the advertisement could be diagonal, rectangular, circular, or other polygonal shape, with the actual size and shape depending on the content of the advertisement or the amount of free space available on the web page. Regardless of the position or size of the advertisement, the fixed position advertisement remains in view as the user scrolls the web page.

The fixed position advertisement is especially useful for web pages with large amounts of content, which force the user to scroll down a page in order to view all of the content or simply to find the content of interest to the user. This tends to be the case for blog pages, where each blog entry is appended to existing or previous blog entries. This often creates very long web pages that require substantial scrolling in order to view all of the web page's content in the browser window. However, the fixed position advertisement can also be advantageously used on a web page of any length and/or width, because it allows the advertisement to be exposed to the user for a longer period of time than for traditional advertisements. Traditional advertisements, statically placed at a particular location on the web page, can be easy to overlook and can quickly go out of a user's view as the user scrolls up or down (or left or right) to access various parts of the web page. The herein disclosed fixed position advertisement solves this problem by allowing the advertisement to remain in view as long as the user does not close the advertisement or the current web page.

In an embodiment, the fixed position advertisement would stretch the full width, or height, of the current HTML frame. For example, if a web page is displayed using two frames, with a first frame positioned on top of a second frame, the fixed position advertisement could be displayed only on the top frame. Alternatively, if the first frame corresponds to a third party website and the second frame corresponds to the current website, then the fixed position advertisement could be displayed on the second frame corresponding to the current website. As previously discussed, in embodiments the fixed position advertisement may stretch a fraction of the full width or the full height of the current HTML frame, or may have a fixed size and position, such as that bottom, left corner, that that does not stretch to fit the size of the web browser window or the current HTML frame.

In an embodiment, if the advertisement was fixed at the top or bottom of the browser window, then the advertisement would stretch the full width of the browser window and would have a height of 40 pixels. Alternatively, if the embodiment was fixed at the left or right side of the browser window, then the advertisement would stretch the full height of the browser window and would have a width of 40 pixels. While these dimensions appear to work well, these dimensions could be readily customized by the owner or administrator of the web page.

The fixed position advertisement may consist of advertisements with text, images, videos, animated advertisements, other types of advertisements, or a combination of all of these. Animated advertisements can include advertisements using technologies such as FLASH, SHOCKWAVE, SILVERLIGHT, an applet, other web browser plug-ins, etc.

In an embodiment, the fixed position advertisement would be an interactive advertisement including an interaction prompt, as previously discussed herein. For example, if a user visits a web page incorporating the herein disclosed fixed position advertisement and moves his or her mouse over the advertisement, a counter starting from a high number and decrementing by one every second, or some other predetermined time interval, can warn the user that the full advertisement will be deployed once the counter reaches zero (or some other predetermined number). The height of the fixed position advertisement will depend on the actual website and can be dynamically configured. Ideally the advertisement would fit one to two lines of text, images or image strips, or even a scaled version of an animation or video. The fixed position advertisement could also have a minimum size and a maximum size associated as default properties, forcing a minimum and a maximum size regardless of the properties of the website.

Figure 14:
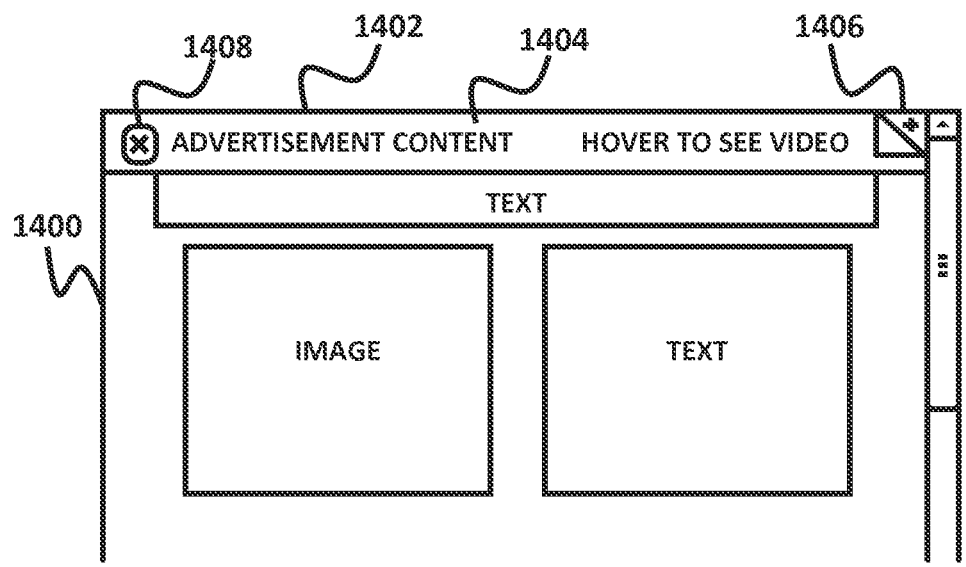
FIG. 14 illustrates an example web page with a fixed position advertisement unit located at the top of the browser window.

FIG. 14 illustrates a partial view of a browser window 1400 with the advertisement unit 1402 positioned at the top of the browser window 1400. The advertisement unit 1402 contains advertisement media content 1404, which can include text, an image, an image strip, a scaled video, or a combination of one or more of these elements. The advertisement unit 1402 could also include an interaction prompt 1406, with one of many possible engagement properties as previously discussed herein, located at the top right corner of the advertisement unit 1402. The advertisement unit 1402 could also include a button or widget 1408 allowing the user to close the advertisement unit. In an embodiment, the interaction prompt 1406 would be as illustrated in FIG. 5, comprised of a turned corner 510 and an engagement warning or indicator that includes a change symbol 512 as the warning device. The turned corner 510 makes the advertisement look as though it is made of paper and that the upper right hand corner has been bent forward as if to turn the page. The turned corner 510 gives the user the visual image that there is something else behind the advertisement that could be reached by interacting with the upper right hand corner. Other visual tools or devices, located anywhere, can also be used as the interaction prompt, such as a tab, a semi-transparent section that gives the user the ability to interact with the advertisement unit 1402 and which convey similar impressions as the turned corner.

Figure 15:
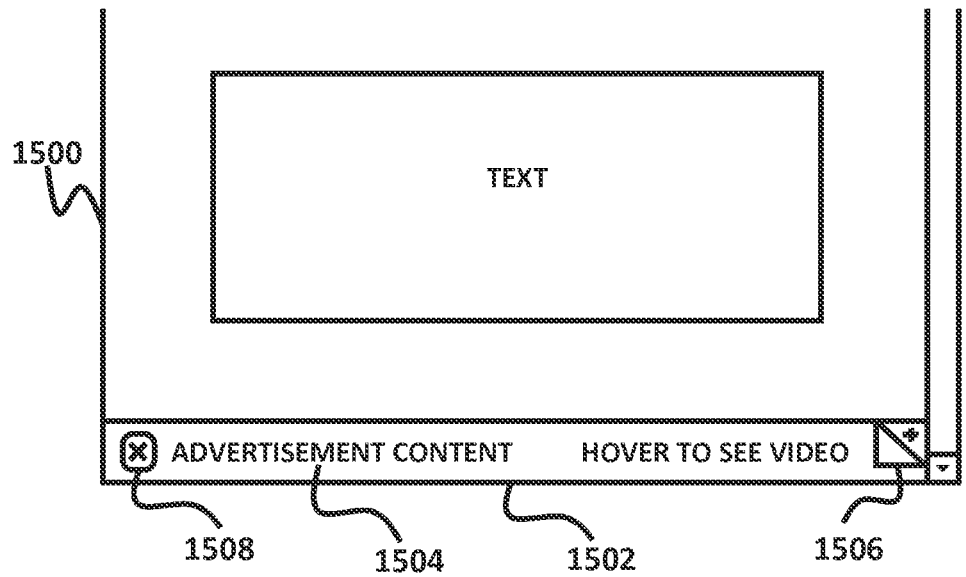
FIG. 15 illustrates an example web page with a fixed position advertisement unit located at the bottom of the browser window.
Figure 16:
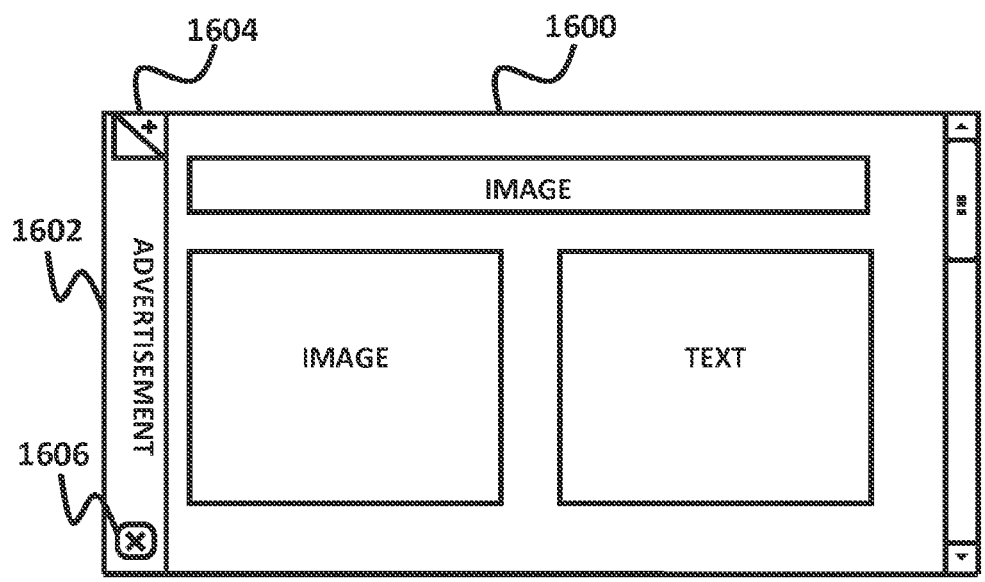
FIG. 16 illustrates an example web page with a fixed position advertisement unit located on the left side of the browser window.
Figure 17:
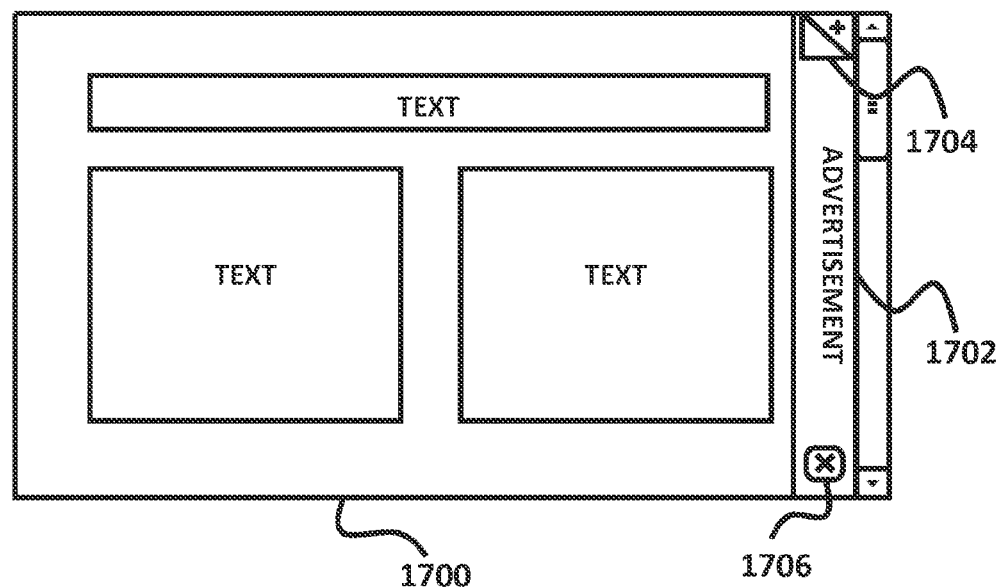
FIG. 17 illustrates an example web page with a fixed position advertisement unit located on the right side of the browser window.

FIG. 15 illustrates a partial view of a browser window 1500 where the advertisement unit 1502 is located at the bottom of the browser window. The advertisement unit 1502 would include advertisement media content 1504, the interaction prompt 1506, and the closing widget or button 1508. As the web page 1500 is scrolled, the advertisement unit 1502 remains fixed at the bottom of the browser window, stretching the full-width of the browser window. FIG. 16 illustrates another example of a browser window with the fixed position advertisement unit 1602 located on the left side of browser window 1600. In the case where the fixed position advertisement unit is placed vertically, the advertisement unit stretches along the full height of the portion of the web page visible in the browser window. The interaction prompt 1604 can be placed at the top of the vertically fixed advertisement unit 1602, but it can also be placed at the bottom. Similarly, the close button or widget 1606 can be placed at the bottom of the advertisement unit 1602, as illustrated in FIG. 16, or it can be placed at the top of the advertisement unit 1602. FIG. 17 illustrates yet another example browser window 1700, with the fixed advertisement unit 1702 placed on the right side of the browser window 1700, stretching the full height of the portion of web page 1700 visible in the browser window. The fixed position advertisement unit 1702 would include an interaction prompt 1704, and the closing button or widget 1706.

Figure 18:
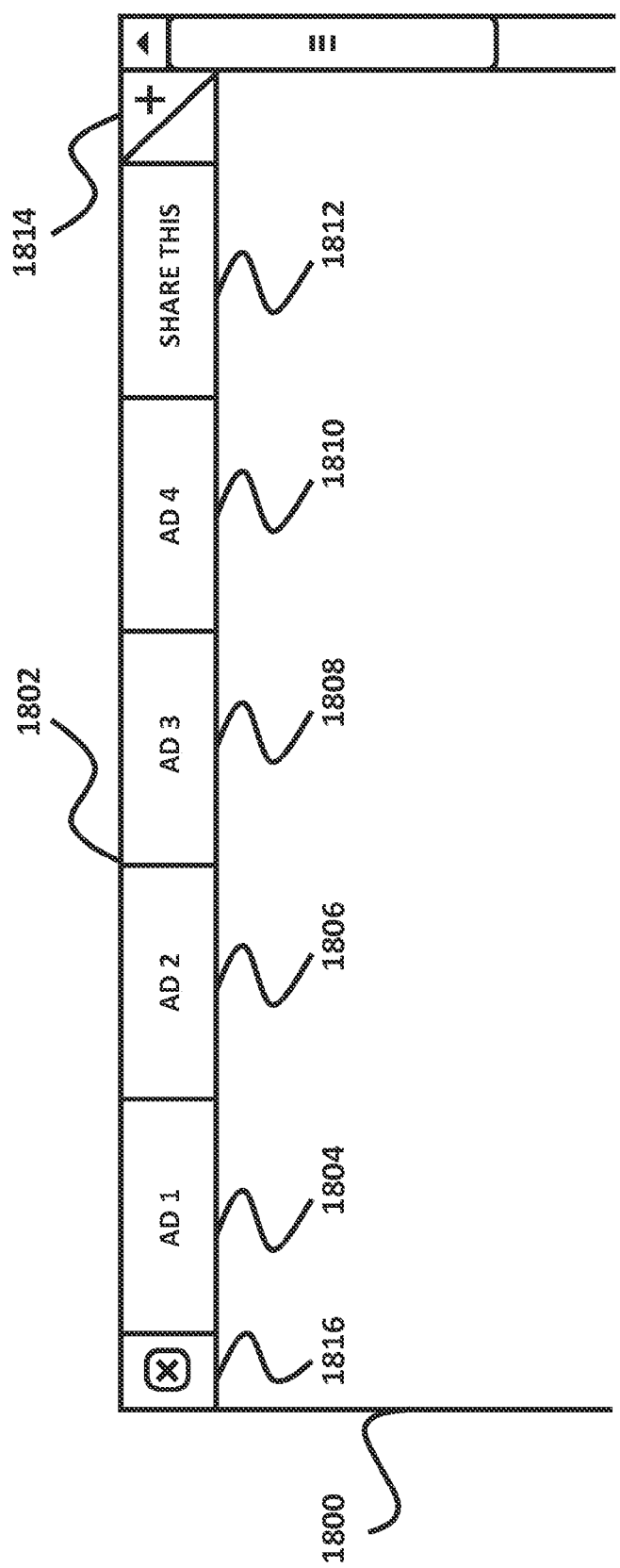
FIG. 18 illustrates an example web page with a fixed position advertisement unit, with the advertisement unit divided into one or more advertisements.

FIG. 18 illustrates an alternative embodiment, wherein the fixed position advertisement is divided horizontally into several advertisements, thus presenting the user with a strip of various advertisements. For example, the fixed position advertisement unit can be divided into four sections, allowing for four advertisements to be displayed side by side either along the top, bottom, left, or right side of the browser window, or any other position within the web page. The fixed position advertisement unit 1802 is shown at the top of the browser window 1800, but it could be placed at the bottom of the browser window, or on the left or right sides of the browser window. The fixed position advertisement unit 1802 contains four advertisements 1804, 1806, 1808, and 1810. These advertisements may be for different companies, or each may contain a different element of the same advertisement. For example, advertisement 1804 can contain a brand logo, advertisement 1806 can contain some text, advertisement 1808 can contain a running video, and advertisement 1810 can contain another image or text advertisement. The fixed advertisement unit may also contain a sharing link 1812 (or a sharing button 1812) for sharing the advertisement 1802, or for sharing the video in the advertisement unit 1802. For example, the advertisement unit 1802 could be advertising a movie, with one of the advertisement sections running a short trailer of the movie, such as advertisement section 1810. The sharing button 1812 allows the user to share the trailer with other users, by either allowing the user to enter an e-mail address to which the advertisement content or video can be forwarded, or allowing the user to save the advertisement locally on the user's computer.

While embodiments of the fixed position advertisement have been described in reference to FIGS. 14-18, it is intended that changes and modifications can be made to the described embodiments without departing from the true scope and spirit of the invention. For example, embodiments illustrated in FIGS. 14-18 may include the turned corner 510 on a different position, such as in the bottom left corner instead of being in the upper right corner, or may not include the turned corner 510 at all. Alternatively, a different interaction prompt may be used instead of the turned corner 510, etc.

In another embodiment, the fixed position advertisement can additionally act as a toolbar, allowing the user to perform actions such as saving the advertisement, sharing or forwarding the advertisement to another party, visiting the advertisement website, entering a comment regarding the advertisement, etc. In yet another embodiment, the user would be able to resize the advertisement unit. For example, the user may want to view the details of the advertisement in a larger mode, so the user can click and hold one of the corners of the fixed position advertisement, and move the mouse while holding the corner of the advertisement, dynamically scaling the size of the advertisement based on the user's mouse movement. Alternatively, the user could resize the advertisement to different dimensions. For example, the user can resize the shape of the fixed position advertisement so that it only spans half of the browser window, or another desired fraction of the total width or height of the browser window. In another embodiment, the fixed position advertisement would include a set of buttons that can allow the user to change the position of the advertisement. For example, the user can move the fixed position advertisement from the top of the browser window to the bottom of the browser window, or to the left or right of the browser window. Alternatively the user could select this option from a menu. This would be useful for websites which make use of fixed position toolbars at the top or bottom of the webpage to provide a set of functionality related to the website, such as FACEBOOK and MYSPACE. The position of the advertisement could also be determined based on whether it is detected at load time whether the current website already has a toolbar.

Having a fixed position advertisement on a website allows for the advertisement content to be visible in the user's browser window at all times, even as the user scrolls through a long web page or visits other sections of the website. In an embodiment, the fixed position of the advertisement can be determined based on usage patterns or demographic information about the user. Usage patterns may include a rate of interaction based on the browser window position of the fixed position advertisement. For example, a particular user may have a documented history of higher incidences of rates of interacting with advertisement prompts when fixed position advertisements are placed at the top of the browser window. Alternatively, if a certain demographic (for example, male users under 25 years of age) tend to interact at higher rates with fixed position advertisements when the advertisements are presented at the bottom of the browser window, then an advertisement would be positioned at the bottom of the webpage for users fitting that profile.

The fixed advertisement unit can be made to remain fixed at a position relative to the browser window by setting the "position" property of the fixed position advertisement. The position property can be set to have an absolute position which does not change when the user scrolls. Alternatively, the position of the advertisement can be updated dynamically as the user scrolls a web page.

An event handler can be associated with scrolling events in the case of updating dynamically the position of the fixed position advertisement, resulting in the event handler called whenever the user scrolled the web page. When called, the event handler can update the position of the fixed position advertisement based on the scrolling direction, the size of the display screen, the web page content, etc.

Such a dynamic update of the position of the fixed position advertisement based on user scrolling can also be used to give the appearance of web page elements flowing around the fixed position advertisement. For example, as the position of the fixed position advertisement is updated, the event handler can also check whether the fixed position advertisement overlaps other web page element based on their respective positions, sizes, and shapes. Methods for checking whether a plurality of elements overlap are well known in the art. If it was found that there was an overlap between the fixed position advertisement and a number of other web page elements, then the position of the other web elements could be updated accordingly based on the web page content. However, at times it may not be practical to update the positions of the other web page elements since such changes may completely change the layout or the look and feel of the webpage. An alternative solution may simply resize the other web page elements to avoid overlap with the fixed position advertisement. Yet another embodiment may update the position of the fixed position advertisement, regardless of whether it overlaps or covers any other web page elements as the user scrolls the web page.

Cascading style sheets (CSS), used to control the style and formatting of websites, can be used to specify the position of the advertisement unit by setting the position property of the fixed position advertisement unit to the "fixed" value. Other CSS properties can also be used to update position, size, look and formatting, and shape of the fixed position advertisement or of other elements in a web page. While several methods of implementing the fixed position advertisement have been described, alternative methods used to implement an advertisement which remains in a fixed position, and in view of the user, as the user scrolls the web page are encompassed in embodiments of the invention.

While several embodiments have been illustrated and described herein, it is to be understood that the techniques described herein can have a multitude of additional uses and applications. Accordingly, the invention should not be limited to just the particular description and various drawing figures contained in this specification that merely illustrate the several embodiments and application of the principles of the invention.

The invention claimed is:

1. An interactive advertisement device, comprising:
application storage configured to store an advertisement display application;
an input device configured to receive user interactions; and
a processor;
wherein the advertisement display application configures the processor to:
cause display of a webpage, wherein the webpage contains a content region and an advertisement region, and wherein the advertisement region includes an advertisement region width and an advertisement region height;
move the content region in response to receipt of a user interaction, where the advertisement region remains in a fixed position and the content region moves relative to the advertisement region;
cause display of a first advertisement in the advertisement region, where the first advertisement comprises a set of media assets including two or more engagement warnings;
select an engagement warning from the two or more engagement warnings based on the advertisement region;
determine when a first user interaction with the first advertisement has occurred;
cause display of the selected engagement warning in response to the first user interaction with the first advertisement, where the selected engagement warning indicates that further interaction with the selected engagement warning will cause an action by the webpage; and
perform the action indicated by the selected engagement warning in response to receipt of further user interaction.

2. The interactive advertisement device of claim 1, wherein the fixed position of the advertisement region is determined based on a set of user information.

3. The interactive advertisement device of claim 2, wherein the set of user information includes demographic information.

4. The interactive advertisement device of claim 2, wherein the set of user information includes documented usage patterns.

5. The interactive advertisement device of claim 4, wherein the documented usage pattern includes a webpage position rate of interaction.

6. The interactive advertisement device of claim 1, wherein the webpage comprises a webpage width and the advertisement region width is equal to the webpage width.

7. The interactive advertisement device of claim 1, wherein the advertisement region width is less than a webpage width.

8. The interactive advertisement device of claim 1, wherein the fixed position of the advertisement region is determined based on a set of webpage information collected from the webpage.

9. The interactive advertisement device of claim 8, wherein the set of webpage information includes a determination of whether the webpage includes a toolbar and a toolbar location.

10. The interactive advertisement as recited in claim 1, wherein the set of media assets includes an engagement device configured to flow around the fixed position of the advertisement region as the content region moves.

11. The interactive advertisement device of claim 1, wherein the set of media assets includes an engagement device configured to flow under the fixed position of the advertisement region as the content region moves.

12. The interactive advertisement device of claim 1, wherein the advertisement region width and the advertisement region height are based on the first advertisement.

13. The interactive advertisement device of claim 1, wherein the webpage has a webpage width and a webpage height, the content region has a content region width and a content region height, and the advertisement region width and the advertisement region height are based on the webpage width, the webpage height, the content region width, and the content region height.

14. A method for displaying interactive advertising, comprising:
 causing display of a webpage using an advertising display device, wherein the webpage contains a content region and an advertisement region, and wherein the advertisement region includes an advertisement region width and an advertisement region height;
 moving the content region in response to a received request to move the content region using the advertising display device, where the advertisement region remains in a fixed position and the content region moves relative to the advertisement region;
 causing display of a first advertisement in the advertisement region using the advertising display device, where the first advertisement comprises a set of media assets including two or more engagement warnings;
 determining when a first user interaction with the first advertisement has occurred using the advertising display device;
 selecting an engagement warning from the two or more engagement warnings based on the advertisement region using the advertising display device;
 displaying the selected engagement warning in response to the first user interaction with the first advertisement using the advertising display device, where the selected engagement warning indicates that further interaction with the selected engagement warning will cause an action by the webpage; and
 performing the action using the advertising display device in response to receiving further interaction.

15. The method of claim 14, further comprising determining the fixed position of the advertising region using a set of user information and the advertisement display device.

16. The method of claim 14, further comprising determining the fixed position of the advertising region using a webpage position rate of interaction and the advertisement display device.

17. The method of claim 14, further comprising determining the advertisement region width using a webpage width and the advertisement display device.

18. The method of claim 14, further comprising determining the fixed position of the advertisement region using webpage information collected from the webpage and the interactive advertisement display device.

19. The method of claim 18, further comprising determining if the webpage includes a toolbar having a toolbar location using the advertisement display device.

20. The method of claim 14, further comprising determining the advertisement region width and the advertisement region height using the first advertisement and the advertisement display device.

21. The method of claim 14, further comprising determining the advertisement region width and the advertisement region height using a webpage width, webpage height, content region width, content region height, and the advertisement display device.

22. The method of claim 14, further comprising flowing an engagement device around the fixed position of the advertisement region as the content region moves using the advertisement display device, where the media assets include the engagement device.

23. The method of claim 14, further comprising flowing an engagement device behind the fixed position of the advertisement region as the content region moves using the display device, where the media assets include the engagement device.

24. An interactive advertisement device, comprising:
 one or more processors;
 an input device configured to receive user interactions; and
 application storage configured to store an advertisement display application that configures the one or more processors to:
  display a webpage with a content region and an advertisement region, the advertisement region having a specified width and height;
  move the content region in response to receipt of a user interaction so that the content region moves relative to the advertisement region and the advertisement region remains in a fixed position on the webpage;
  display a selected advertisement in the advertisement region, the advertisement comprising a set of media assets that include engagement warnings;
  determine whether user interaction with the advertisement has occurred;
  display a selected one of the engagement warnings in response to the user interaction with the advertisement, the selected engagement warning being displayed on the advertisement and indicating that interaction with the selected engagement warning will cause an action by the webpage; and
  perform the action indicated by the engagement warning, in response to receipt of further user interaction.

* * * * *